US011345088B2

(12) United States Patent
von Burg et al.

(10) Patent No.: US 11,345,088 B2
(45) Date of Patent: May 31, 2022

(54) ADDITIVE MANUFACTURING DEVICE COMPRISING A REPLACEABLE RAW MATERIAL PROCESSING UNIT

(71) Applicant: SINTRATEC AG, Brugg (CH)

(72) Inventors: Christian von Burg, Niederteufen (CH); Dominik Solenicki, Brugg (CH)

(73) Assignee: SINTRATEC AG, Brugg (CH)

( * ) Notice: Subject to any disclaimer, the term of this patent is extended or adjusted under 35 U.S.C. 154(b) by 433 days.

(21) Appl. No.: 16/269,548

(22) Filed: Feb. 6, 2019

(65) Prior Publication Data
US 2019/0263064 A1 Aug. 29, 2019

(30) Foreign Application Priority Data

Feb. 28, 2018 (EP) ..................................... 18159056
Nov. 6, 2018 (EP) ..................................... 18204594

(51) Int. Cl.
| | | |
|---|---|---|
| *B29C 67/00* | (2017.01) | |
| *B29C 64/268* | (2017.01) | |
| *B29C 64/307* | (2017.01) | |
| *B29C 64/227* | (2017.01) | |
| *B29C 64/25* | (2017.01) | |
| *B29C 64/259* | (2017.01) | |
| *B29C 64/153* | (2017.01) | |
| *B29C 64/357* | (2017.01) | |
| *B33Y 30/00* | (2015.01) | |
| *B33Y 40/00* | (2020.01) | |

(52) U.S. Cl.
CPC .......... *B29C 64/268* (2017.08); *B29C 64/153* (2017.08); *B29C 64/227* (2017.08); *B29C 64/25* (2017.08); *B29C 64/259* (2017.08); *B29C 64/307* (2017.08); *B29C 64/357* (2017.08); *B33Y 30/00* (2014.12); *B33Y 40/00* (2014.12)

(58) Field of Classification Search
CPC ... B29C 64/268; B29C 64/307; B29C 64/259; B29C 64/357; B29C 64/153; B29C 64/227; B29C 64/25; B33Y 10/00; B33Y 30/00; B33Y 50/00; B33Y 50/02
See application file for complete search history.

(56) References Cited

U.S. PATENT DOCUMENTS

2016/0339640 A1* 11/2016 Juan ...................... B29C 64/176
2019/0126347 A1* 5/2019 Roman ................. B29C 64/259

FOREIGN PATENT DOCUMENTS

| DE | 102004057865 A1 | 6/2006 |
| DE | 102014010932 A1 | 1/2016 |
| DE | 102015203873 A1 | 9/2016 |
| EP | 1600282 A1 | 11/2005 |
| EP | 1704989 A2 | 9/2006 |
| EP | 3124140 A2 | 2/2017 |

OTHER PUBLICATIONS

Partial European Search Report, EP Application No. 18159056, dated Sep. 3, 2018, 3 pages.

* cited by examiner

*Primary Examiner* — Ryan M Ochylski
(74) *Attorney, Agent, or Firm* — Hard IP LLC

(57) ABSTRACT

A movable raw material processing unit for an additive manufacturing device for manufacturing a solid article comprises a housing comprising a transport device for disengaging the raw material processing unit from the additive manufacturing device. The raw material processing unit comprises a raw material container unit, a build unit and a raw material distribution unit.

3 Claims, 7 Drawing Sheets

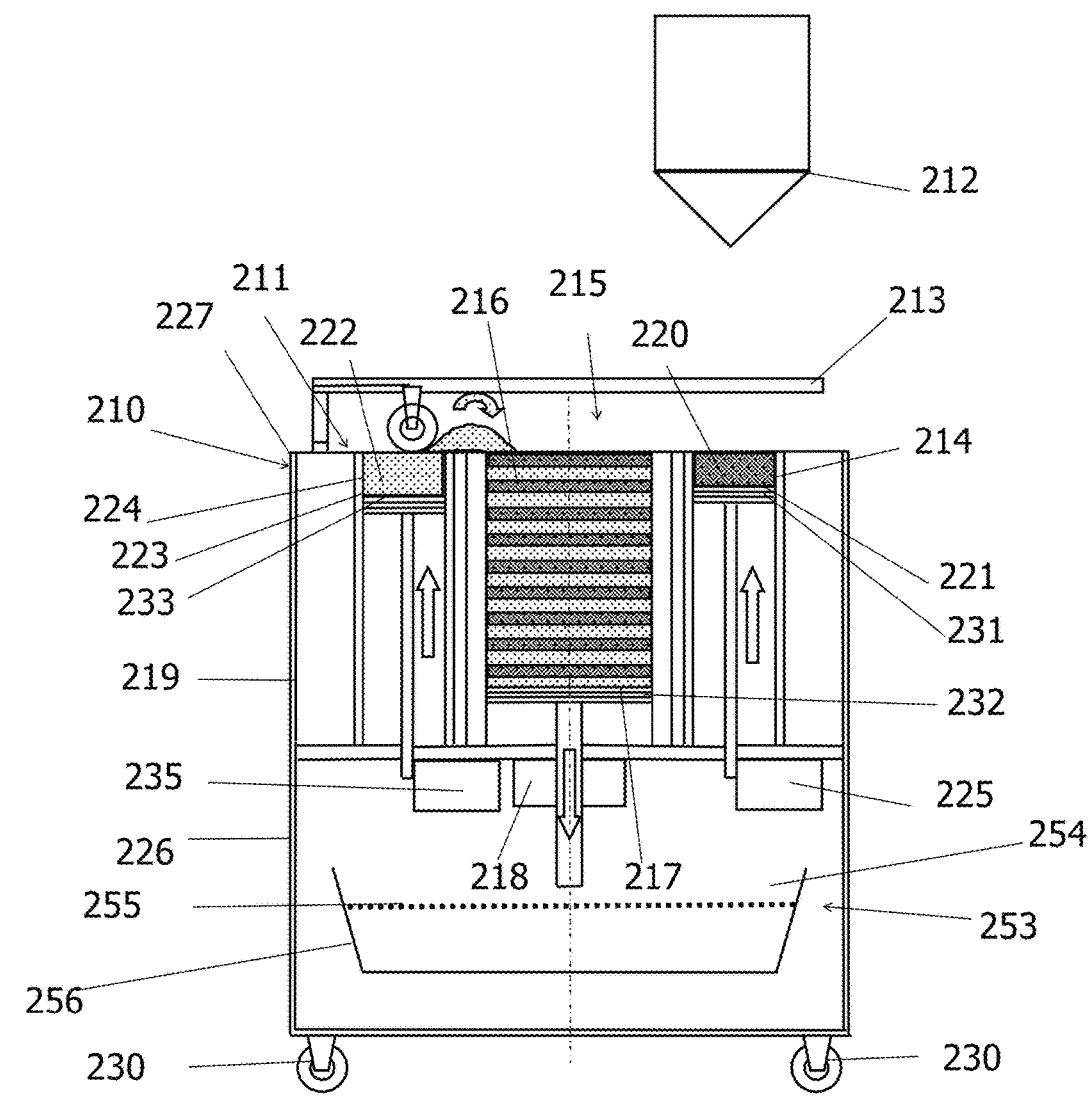

ADDITIVE MANUFACTURING DEVICE COMPRISING A REPLACEABLE RAW MATERIAL PROCESSING UNIT

CROSS-REFERENCE TO RELATED APPLICATIONS

This application claims priority to European patent application no. EP18204594.8, filed on Nov. 6, 2018, which claims priority to European patent application no. EP18159056.3, filed on Feb. 28, 2018, the contents of both of which are incorporated herein by reference in their entirety.

TECHNICAL FIELD

The invention relates to an additive manufacturing device comprising a replaceable raw material processing unit.

Such an additive manufacturing device can be used for the processing of a raw material such as a powder in an additive manufacturing method. Additive manufacturing methods and the corresponding additive manufacturing devices have been in use for a number of years. In particular, laser sintering can be used for additive manufacturing to obtain articles of increased strength on the basis of powder materials.

The additive manufacturing device comprises an energy generation unit and a raw material processing unit. The energy generation unit comprises a beam generation unit and a heat exchange unit. The raw material processing unit comprises a raw material container unit, a build unit and a raw material distribution unit.

Most of the current additive manufacturing devices are configured such that the raw material is supplied to the raw material container unit before a new article is manufactured by the additive manufacturing device. A raw material supply unit can be provided for supplying the raw material to the raw material container of the raw material container unit.

The raw material container of the additive manufacturing device is usually open and can be emptied to extract the manufactured article after each additive manufacturing sequence. The spent raw material is usually also extracted to be examined for any possible contamination.

The raw material container forms thus an integral part of the additive manufacturing device. If the raw material has to be changed to manufacture a solid article from a raw material differing from the one employed for the manufacture of the preceding solid article, the entire raw material container unit has to be emptied, cleaned and refilled. Therefore, the process of substituting a raw material with a different raw material is time-consuming. In addition, the additive manufacturing device can't be used for the manufacture of another solid article until the entire substitution process is completed. Due to the considerable downtime resulting from any raw material exchange including the steps of emptying the raw material container(s), cleaning the raw material container(s) and any other portion of the device in contact with powder and refilling the raw material container (s) with the new raw material, the additive manufacturing device is not operated continuously and therefore possibly useful production time is wasted.

DESCRIPTION OF RELATED ART

It has been contemplated to reduce the downtime of an additive manufacturing device. The document EP 3 124 140 A2 discloses an additive manufacturing device comprising a workstation, a build module and a transport mechanism to move the build module into and out of the workstation. The transport mechanism is one of a conveyor or a rotatable turntable. The configurations disclosed in EP 3 124 140 A2 are suitable to reduce downtime as the transport mechanism removes the build module from the workstation once the solid article is completed. The solid article can be extracted from the powder outside of the workstation. The time step for the advancement of the transport mechanism is therefore determined and controlled by the duration of the manufacture of the solid article in the workstation. Any other process steps, such as the powder feeding, the solid article extraction, cleaning, revising, preparing the additive manufacturing device for a different article or the use of a different material should not take longer than the duration of manufacture as in such a case, the manufacture of the solid article may be delayed or interrupted until the other process steps are completed. Therefore, there is a need to decouple the manufacturing of the solid article entirely from any of the preparatory or subsequent process steps required for preparing the production or for post-processing of the solid article and the build module. It has also been contemplated in DE 10 2004 057 865 A1 to use a housing containing the build unit and the raw material containers mounted on a slide. The housing is shifted away from the workstation containing the energy generation unit after completion of the manufacture of the article to extract the article from the build unit.

This need has already been addressed in the document EP 1 704 989 A2 disclosing a movable build chamber, which comprises a housing wherein wheels are provided on the underside of the housing for moving the build chamber freely on a floor. The build chamber can be removed from the additive manufacturing device after completion of the manufacture of the solid article for the purpose of allowing the solid article to cool down distantly from the additive manufacturing device. The additive manufacturing device can be used for the manufacture of another solid article, while the previously produced solid article is allowed to cool down.

Due to the fact that the solid article is kept inside the raw material, the cooling can require a considerable time. The raw material around the solid article cannot be used again as long as the solid article is immersed in this raw material. Due to the fact that more than 50% of the spent raw material could be reused for a subsequent additive manufacturing process, a recycling of the spent raw material in the build chamber is of considerable interest, both from an economical perspective as well as from an ecological perspective.

It is therefore an object of the invention to provide a build chamber including a raw material chamber, in which the solid article can be cooled more efficiently but also the excess raw material which had not been used for manufacturing the solid article can be recovered and recycled.

SUMMARY OF THE INVENTION

The build chamber is thus provided with additional functionalities which result in a moveable raw material processing unit which is detachable from the energy generation unit, such that the manufacturing of the solid article in the additive manufacturing device can proceed independently of any preparatory or post-processing steps. In case of any inadvertent interruption of the production process or any of the preparatory or consecutive processes, all processes can continue while the necessary measures are taken to fix any defect affecting any one of these processes.

The moveable raw material processing unit for an additive manufacturing device for manufacturing a solid article comprises a housing configured as a transport device configured to be disengageable from the additive manufacturing device. The housing of the raw material processing unit contains a raw material container unit, a build unit and a raw material distribution unit, wherein the housing is removable from the additive manufacturing device. The transport device can include a transport element, which is provided on the underside of the housing for moving the raw material processing unit freely on a floor. The transport device may include a magnet disposed on the raw material processing unit and a further magnet placed in the floor which can be actuated to move the raw material processing unit on the floor. According to an embodiment, the transport device can include a drive unit for the transport element or a plurality of transport elements.

According to an embodiment, a transport element is attached to the housing. Such a transport element can comprise a transport element selected from the group consisting of roller elements, tires, wheels. The transport element is configured to allow movement of the housing to any location on a surface, such as a floor. Therefore, the housing is freely movable relative to the additive manufacturing device. The housing can be placed by means of the transport device at any location independently from the location of the additive manufacturing device. The housing is therefore movable in more than one direction with respect to the additive manufacturing device, which can be stationary.

According to an embodiment, the housing includes a wall, in particular a circumferential wall. The wall according to this embodiment comprises a wall edge, whereby the wall edge can comprise an engagement mechanism for connection of the raw material processing unit with an energy generation unit of the additive manufacturing device for manufacturing a solid article. In particular, the engagement mechanism comprises one of a hook, a groove, a snap-fit mechanism.

According to an embodiment, the raw material processing unit comprises a docking unit for fixing the raw material processing unit to an energy generation unit of the additive manufacturing device for manufacturing a solid article.

According to an embodiment, the raw material processing unit comprises a manipulation element, such as a handle for moving the raw material processing unit.

According to an embodiment, the raw material processing unit comprises a displacement mechanism, such as a level adjustment mechanism. The level adjustment mechanism can be configured to adjust the height of the raw material processing unit to the corresponding energy generation unit, to which it is to be coupled for manufacturing a solid article.

According to an embodiment, the raw material container unit comprises a raw material container configured to contain a raw material for the manufacture of a solid article, whereby the build unit is configured to receive the raw material from the raw material container. The raw material distribution unit can be configured to transport a portion of the raw material from the raw material container to the build unit. The raw material container can comprise a raw material chamber of variable volume. The raw material chamber can comprise a raw material chamber bottom. The raw material chamber bottom can be connected to a raw material container drive unit for moving the raw material chamber bottom to change the volume of the raw material chamber when in operation. The build unit can comprise a recipient of variable volume configured to receive the portion of the raw material from the raw material container. The build unit can comprise a recipient bottom connected to a build unit drive unit for moving the recipient bottom to change the volume of the recipient when in operation.

An additive manufacturing device for manufacturing a solid article comprises an energy generation unit and a raw material processing unit, whereby the energy generation unit comprises an energy beam generation unit. The raw material processing unit comprises a raw material container unit, a build unit and a raw material distribution unit. The raw material container unit comprises according to an embodiment a raw material container containing a raw material for the manufacture of a solid article. According to an embodiment, the raw material container unit can comprise a plurality of raw material containers. The build unit can be configured to receive the raw material from the raw material container. The raw material distribution unit is configured to transport a portion of the raw material from the raw material container to the build unit. The raw material container can comprise a raw material chamber of variable volume. According to an embodiment, the raw material chamber comprises a raw material chamber bottom, whereby the raw material chamber bottom is connected to a raw material container drive unit for moving the raw material chamber bottom to change the volume of the raw material chamber when in operation. The build unit comprises according to an embodiment a recipient of variable volume configured to receive the portion of the raw material from the raw material container. The build unit comprises a recipient bottom connected to a build unit drive unit for moving the recipient bottom to change the volume of the recipient when in operation. The raw material processing unit is removably connectable to the energy generation unit. The raw material processing unit is freely movable in any direction when not connected to the energy generation unit. The raw material processing unit comprises a housing comprising a transport device configured to be disengageable from the additive manufacturing device. The housing of the raw material processing unit contains a raw material container unit, a build unit and a raw material distribution unit wherein the housing is removable from the additive manufacturing device.

When in operation, a raw material surface can be exposed to an energy beam to be emitted by the energy beam generation unit. According to an embodiment, the energy generation unit can comprise a heat exchange unit. The heat exchange unit can include a heating surface for heating the raw material surface to form a pre-heated raw material surface. The energy beam generation unit is disposed with a directing unit to direct the energy beam onto the pre-heated raw material surface. The directing unit is configured to direct the energy beam onto the pre-heated raw material surface. The path of the energy beam can be generated according to a computer-generated model of the solid article stored in a storage unit associated with a control unit.

The pre-heated raw material surface can form the upper surface of an uppermost layer of raw material in the recipient, such that the uppermost layer of raw material is transformed into a coherent sub-structure when exposed to the energy beam such that the solid article is formable by a coherent structure formable from the or each sub-structure in the layer of raw material or in each of the plurality layers of raw material including the uppermost layer of raw material.

When the manufacturing of the solid article is initiated, a first layer of material, which forms the uppermost layer of raw material, is applied on the bottom surface of the recipient. The coherent sub-structure is formed by exposing the uppermost layer to the energy beam. After completion of the coherent sub-structure in this first layer of material, a further uppermost layer is deposited on top of this first layer to form a second layer. Again, a coherent-sub-structure is formed by exposing the uppermost layer to the energy beam. The coherent sub-structure manufactured in each layer of material extends thus on top of the raw material already present in the raw material container from previous raw material application steps. The coherent structure is formed by each of the coherent sub-structures of each of the layers. In particular, the coherent sub-structures of neighboring layers match at least partially, such that the coherent structure is obtainable from the coherent sub-structures of the or each of the layers below the uppermost layer if the uppermost layer is not the only layer present in the recipient.

The solid article is formable by the coherent structure obtained from the plurality of coherent sub-structures crafted by the energy beam in each of the plurality layers of raw material including the uppermost layer of raw material. The coherent sub-structures of neighboring layers are interconnected so as to form a portion of the coherent structure which constitutes a portion of the solid article. As long as new layers of raw material are placed on top of the raw material layers containing a portion of the coherent structure, the manufacture of the solid article continues. Upon the formation of the last coherent sub-structure on top of the portion of the previous coherent sub-structures the entire solid article is formed as a coherent structure.

The energy beam can be any type of beam capable of transporting energy to change the temperature of the raw material surface in a way that it alters its composition, for instance by performing a chemical reaction or by at least partially melting the particles of a powder, e.g. by sintering. Thus, the beam is an energy transporting beam, further referred to as an energy beam. In particular, the energy beam comprises a laser beam.

According to an embodiment, the raw material container unit is connectable to a raw material supply unit for refilling the raw material container with raw material in particular when the raw material processing unit is not in operation.

According to an embodiment, the raw material processing unit comprises a housing, whereby the housing is configured to interlock with a corresponding housing for the energy generation unit. In particular, the housing of the raw material processing unit includes a wall having an upper edge, whereby in the operative state, the upper edge is configured to be inserted into the housing of the energy generation unit.

According to an embodiment, the raw material processing unit is configured such that the raw material supply unit and the raw material container unit are arranged such that raw material can be transferred from the raw material supply unit to the raw material container. In particular, a displacement mechanism can be provided to lift or lower the bottom surface of the raw material supply unit or the raw material container unit for filling the raw material container with raw material.

An advantage of an open raw material container lies in the fact that the supply of raw material to the raw material container doesn't present any difficulties. The supply of raw material may not only be achieved by a raw material container involving a stepwise rise of the bottom surface to supply the raw material to be distributed by the raw material distributor to provide each uppermost layer but also by a feed hopper arranged above the raw material feed such as disclosed in some of the embodiments of EP1600282 A1.

A system including an additive manufacturing device according to any of the preceding embodiments can comprise a raw material supply unit for supplying the raw material processing unit with raw material and a raw material disposal unit for receiving raw material from the build unit after completion of the additive manufacturing method for manufacturing the solid article.

According to an embodiment, a raw material disposal unit is configured to receive surplus raw material. The raw material disposal unit can comprise a treatment device for transforming the spent raw material into recycled raw material. The raw material disposal unit can include a sieve. The raw material disposal unit can include a container for collecting any surplus raw material from the cover of the raw material processing unit. The raw material distribution unit can move such surplus raw material to the container. An opening can be provided in the cover of the raw material processing unit, through which the surplus raw material can fall and enter the container. The recipient can receive the raw material from the container through an opening provided in the container bottom. The opening can be closed if it is desired to accumulate raw material in the container. The opening can be opened temporarily. The sieve can be arranged in the opening to sieve the raw material before it enters the recipient. Thereby, the raw material can be homogenized, and a more uniform particle size can be obtained. In other words, the particle size distribution of the raw material in the recipient corresponds to the particle size distribution of the raw material supply unit. Any agglomerates or contaminations of the raw material or the spent raw material can be retained in the sieve and can be discarded periodically or continuously. The sieved raw material can be used for recycling. The recipient containing the sieved raw material can be removed from the raw material processing unit when filled. The recipient can be used as a material supply unit. It can be used as a complementary supply unit together with a supply unit for newly supplied raw material or instead of a material supply unit. Periodically the recipient can be replenished with new raw material to make up for the raw material which has been consumed for the solid article.

The recycled raw material, which can comprise one of the spent or sieved raw material can also be fed into the raw material supply unit to be used for the manufacture of another solid article by the additive manufacturing method.

According to an embodiment, any of the raw material supply unit, the raw material container or the raw material disposal unit are of a circular or rectangular configuration.

At least one of the walls of the housing of the raw material processing unit can comprise a manipulation element, such as a handle or a grip.

At least one of the walls of the housing of the energy generation unit or the raw material processing unit can be disposed with a sealing element. The sealing element is configured to provide a seal to seal the gap between the housing of energy generation unit and the raw material processing unit, so as to prevent air passing from the environment to the space containing the raw material container, the raw material supply container and the raw material chamber.

According to an embodiment, the energy generation unit or the raw material processing unit comprises an insulation. In particular, the wall of the housing of the energy generation unit or the raw material processing unit can be provided with an insulation.

According to an embodiment, an inner wall can be arranged inside the wall of the energy generation unit or the raw material processing unit. The inner wall and the wall can be arranged at a distance to the wall, which forms the outer wall. If the energy generation unit or the raw material processing unit comprises an inner wall, an insulation can be provided between the outer wall and the inner wall. The insulation can include an insulating material can be disposed between the inner wall and the outer wall. Alternatively, the space between the outer wall and the inner wall can contain a gas such as air. Alternatively, the space between the wall and the inner wall can be evacuated. A particular advantage of this embodiment lies in the reduction of heat loss across the wall of the corresponding housing.

According to an embodiment, the distance between the raw material surface and the heating surface can be reduced, thereby reducing the required thermal input. Thus, for such an embodiment, the heating surface can be in contact with the raw material surface at least during the period of operation of the beam for creation of the solid article. According to an embodiment, a space is foreseen between the raw material surface and the heating surface. The volume of this space is defined by the raw material surface and the distance between the raw material surface and the heating surface. The volume can correspond to a cylinder, if the raw material surface is circular or can correspond to one of a cube, a pyramid, a prism, if the raw material surface is of rectangular shape.

The distance between the raw material surface and the heating surface can correspond to at least the thickness of the uppermost raw material layer at least during the period of recreation of a subsequent uppermost raw material layer. The distance between the raw material surface and the heating surface can correspond to at most 20 cm. Advantageously, the distance between the raw material surface and the heating surface corresponds to at most 5 cm. According to this embodiment, a raw material distribution unit may be arranged or may be passed between the uppermost raw material layer and the heating surface for distribution of the raw material for the subsequent raw material layer. The smaller the distance between the raw material surface and the heating device the better the heat transfer can be controlled. The smaller the overall volume becomes, the faster the space between the heating surface and the raw material surface can be heated. Therefore, the energy consumption can be considerably reduced. This synergistic effect of the distribution of the heat generated by the beam and the sintering process may lead to an unexpected decrease in energy consumption with respect to prior art additive manufacturing devices.

According to an embodiment, the heating surface is movable such that the distance between the heating surface and the raw material surface of the uppermost raw material layer differs during the period of exposition to the energy beam from the period of addition of a new raw material surface layer becoming the new uppermost raw material layer. Thereby, a more uniform distribution of the heat is possible, such that the raw material surface can be preheated evenly. Thereby, any hot spots in any particular area of the raw material surface can be avoided.

In particular, the heating surface may be moved towards the raw material surface prior or during operation of the beam and the heating surface may be moved away from the raw material surface after the exposition of the raw material surface to the beam or before the exposition of the raw material surface to the beam. Thus, the heating surface can be arranged at a first distance to the raw material surface during operation of the beam and the heating surface can be arranged at a second distance to the raw material surface after the exposition of the raw material surface to the beam or before the exposition of the raw material surface to the beam, whereby the first distance is less than the second distance. The first distance is smaller than the second distance. In particular, if the raw material processing unit is equipped with a displacement mechanism, in particular a level adjustment mechanism, the position of the raw material surface with respect to the energy generation unit containing the heat exchange unit can be adjusted.

The additive manufacturing device can be one of a laser sintering device, a laser melting device, a mask sintering device, a drop-on powder device, a drop on bed device, a stereolithographic device.

For the beam to be transmitted through the heating surface of the heating device, at least a portion of the heating surface can have a transmittance for the beam. In other word, in an embodiment, at least a portion of the heating surface is transmissible for the beam.

Advantageously the wavelength can be in the range from ultraviolet light to far infra-red light, thus from about 100 nm up to and including 1 mm of wavelength. Ultraviolet light thereby lies in a range of less than 100 nm up to and including about 380 nm of wavelength. Far infra-red light thereby lies in a range of about 30 μm up to and including about 1 mm of wavelength.

According to an embodiment the wavelength can be in the range from visible light to mid-infra-red light, thus from about 400 nm up to and including 30 μm of wavelength. Visible light thereby lies in a range of less than 400 nm up to and including about 750 nm of wavelength. Mid-infra-red light thereby lies in a range of more than 3 μm up to and including about 30 μm of wavelength. In this range, a $CO_2$ laser can advantageously be employed.

According to a preferred embodiment the wavelength can be in the range from visible light to near-infra-red light, thus from less than about 400 nm up to and including 3 μm of wavelength. Visible light thereby lies in a range of less than 400 nm up to and including about 750 nm of wavelength. Near-infra-red light thereby lies in a range of more than 750 nm up to and including about 3 μm of wavelength.

According to a particularly preferred embodiment the wavelength can be in the range of 100 nm up to and including 3 μm of wavelength.

According to a particularly preferred embodiment the wavelength can be in the range of about 100 nm up to and including 900 nm of wavelength.

According to an embodiment, the heating surface is transparent for a beam in particular of a diode laser. In particular, the heating surface is transparent for light of a wavelength in the range of 300 nm up to and including 1100 nm, preferably of a wavelength in the rage of 400 up to and including 950 nm, particularly in a preferred range of 445 nm up to and including 808 nm. An advantage to use a laser in the visible spectrum is that it makes optical adjustments during the additive manufacturing process safer. Conveniently a diode laser can be used, which can comprise a semiconductor based on any one of the following base compounds: AlN, GaN, SiC, InN, BeSe, ZnS, MgS, MgSe, BeTe, ZnSe, AlP, GaP, AlAs, ZnTe, CdSe, GaAs, InP, Si, Ge or combinations of these materials, such as InGaAlP, GaAlAs, InGaAs, InGaAsP. In particular, a blue laser can be used. The power of the laser can be conveniently in a range of 0.1 W up to 100 W. Advantageously, a laser operating in the blue range of the spectrum is used. According to a particularly preferred example, one or more blue lasers of 2.3 W are used. Alternatively, a $CO_2$ laser can be used, whereby the base compound of a $CO_2$ laser is carbon dioxide.

According to an embodiment, the heating device is configured as a solid body, in particular as a plate element, which has a length and a width and a height, whereby the height of the heating device is smaller than the length or the width, whereby the length of the heating device corresponds at least to the length of the raw material container and the width of the heating device corresponds at least to the width of the raw material container. The length and the width of the heating device can be the same, in particular if the heating device has a quadratic cross-section or a circular cross-section in which the length and the width correspond to the diameter of the heating device. In particular, the heating device can form a cover or lid of the raw material container, whereby the raw material is enclosed in a closed space formed by the bottom and walls of the raw material container on one hand and by the heating device on the other hand. The heating surface can be in contact with the surface of the raw material. According to an embodiment, the material container can be configured as a heated material container.

According to an embodiment, the heating device can contain a heating element. The heating element can extend essentially along the circumference of the heating surface. According to a further embodiment, the heating device can contain a plurality of heating elements for heating a plurality of heating surfaces. In particular, a plurality of heating surfaces can be provided on the circumference of a centrally arranged heating surface, which has a transmittance to the beam. According to an embodiment, the heating surface can be heated by the heating element.

According to an embodiment, the heating surface can comprise a sensor element, in particular a temperature sensor element or can be a sensor element.

According to an embodiment, the distance between the heating surface and the pre-heated raw material surface can be less than 200 mm. The distance should be sufficient to accommodate a raw material distribution unit for distributing the raw material from the raw material supply container to the raw material container for generating a new layer of raw material. The raw material distribution unit can comprise one of a doctor blade, a forward rotating roller or a counter-rotating roller. The raw material can be distributed by spreading the raw material over the raw material surface of the previous layer after completion of the previous solid layer portion of the solid article.

According to an embodiment, the distance between the heating surface and the pre-heated raw material surface is less than 10 mm. Thereby the air gap between the heating surface and the raw material surface is minimized. The heating device or the raw material container can be movable to allow the raw material distribution unit to pass between the heating surface and the pre-heated raw material surface, in particular in a direction normal to the raw material surface such that when the solid article is formed by a succession of layers, the distance between the heating surface and the pre-heated raw material surface remains substantially constant. In particular, the temperature of each of the heating surfaces may vary based on temperature gradients present in the pre-heated raw material. In particular, the temperature of the heating surfaces may be higher than the temperature of the pre-heated raw material surface. Thereby the heat sink effect of the wall of the raw material container can be compensated for. By providing an independent temperature control for any of the heating surfaces, the temperature of the pre-heated raw material surface can be kept substantially constant. In particular, the variation of the temperature over the pre-heated raw material surface can be less than 4 degrees Celsius, more preferably less than 2 degrees Celsius, most preferred less than 1 degrees Celsius.

In particular, the boundary regions of the raw material, i.e. the raw material close to the wall of the raw material container tend to be colder than the core regions and the previously sintered regions tend to be hotter. For this reason, a multi-zone heating device according to the configuration as set out in the previously described embodiment can be particularly of advantage as any zone can contain individual sensors and individually controlled heating elements.

For these reasons, the distance between the heating surface and the pre-heated raw material surface in some preferred embodiments is less than 200 mm, advantageously less than 100 mm, and particularly preferred less than 10 mm. Thereby the thermal energy can be transferred substantially without losses from the heating surface to the pre-heated raw material surface.

According to an embodiment, the heating surface comprises a nonstick coating, such as a polytetrafluorethylene (PTFE). The raw material surface can be in contact with the heating surface. Thereby heat is transmitted by conduction and losses due to convective heat transfer are essentially eliminated if such a configuration is used in an embodiment.

The heating surface can contain at least one the elements of the group of a transparent conductive oxide (TCO), a network of nanowires, of nanotubes or a glass material. According to an embodiment, the heating surface contains a transparent conductive oxide, such as for example indium tin oxide at least for a segment which requires a substantial transmittance for the beam. Alternatively, or in addition thereto, the heating surface can contain a network of nanowires. The structure of nanowires can in particular include thermally and/or electrically conducting materials, such as metals. In particular, a structure containing Ag, Au nanowires can be used. These nanowires can be embedded in a resin so to enhance thermal conductivity of such a resin. According to another variant, an intelligent mobile accurate thermo-electrical device, also known as IMAT can be used as a heating surface. Such an IMAT heating surface comprises a conductive transparent heater. A material employed for such an IMAT heating surface can be a carbon nanotube. A thin, lightweight, transparent heating surface can be obtained. The surface may be stretchable or flexible, thus may be adaptive to variable geometrical dimensions of the solid article and the raw material container to be used. Conductive films made with carbon nanotubes and metal nanowires, in addition to their low sheet resistance, possess an optical transmittance in the visible spectrum and can form electrically conductive, yet almost completely transparent films, measuring only about 50-100 nanometers thick. The conductive film can be placed on a glass or plastics substrate, such as a PET or polycarbonate substrate.

According to an embodiment, the heating surface can include a glass material, in particular one of the group of magnesium fluoride ($MgF_2$), a sapphire, a calcium fluoride ($CaF_2$), barium fluoride ($BaF_2$), zinc selenide (ZnSe), silicon (Si), a silicon dioxide (silica, $SiO_2$), a borosilicate, germanium (Ge), iridium (Ir) potassium bromide (KBr), sodium chloride (NaCl) or zinc sulfide glass. The glass material can also comprise combinations of these materials, in particular, the glass can be composed of a plurality of layers of different composition, wherein at least one of the layers contains one of the group of compounds named in the previous sentence.

In particular, any of the above glass materials may be used for obtaining a high transmittance for a $CO_2$ laser through the heating surface. Under transmittance, it is to be understood the percentage of laser light passing through the heating surface. A transmittance of 80% or more means that at least 80% of the laser is transmitted through the heating surface. A transmittance of 90% means that at least 90% of the laser is transmitted through the heating surface. A transmittance of 95% means that at least 95% of the laser is transmitted through the heating surface. The laser can be in particular a $CO_2$ laser or a diode laser comprising any of the base compounds mentioned earlier.

According to an embodiment, the heating surface can comprise a conductive film, e.g. a conducting film containing any of the materials of the group of a transparent conductive oxide (TCO), a network of nanowires, nanotubes or of a glass material. The conductive film can also be placed on an elastic polymer to provide a configuration of an adjustable heating surface. According to a further embodiment, a multifilament yarn containing carbon nanotubes can be woven to form a textile or fabric heating surface.

According to an embodiment, the heating device comprises an upper surface extending in substantially opposite direction with respect to the heating surface. The upper surface can comprise an anti-reflective coating, such that the beam can pass the heating device without being reflected by the upper surface.

According to an embodiment, the heating device comprises an upper and lower surface whereby the heating surface is sandwiched between the upper and the lower surface. The upper and lower surfaces can comprise an anti-reflective coating or layer, such that the beam can pass the heating device without being reflected by the upper and lower surfaces.

According to an embodiment, a heating device can be provided which comprises a heating surface and heated surface. The heated surface can be heated by the heating surface. The heated surface can be provided between the heating surface and the pre-heated raw material surface. The heated surface receives thermal energy from the heating surface, whereby the temperature of the heated surface increases. In other words, the heated surface is passively heated. The heated surface can be in contact with the raw material surface and transmits the thermal energy received from the heating surface to the raw material surface to form a pre-heated raw material surface which is suitable for generating a layer of a solid article by application of a beam onto a selected portion of the pre-heated raw material surface. The heated surface may or may not be transmissible to the beam, in particular the energy beam, for instance laser light. If not, it is placed outside the beam path.

According to an embodiment, a compression force can be applied onto the raw material by pressing the raw material surface against a pressurizing device. In other words, the raw material is compressible by a pressurizing device. The pressurizing device can be arranged in the raw material supply unit and/or in the heating device. In particular, the pressurizing device can comprise the heating surface. In case a pressure is to be applied onto the raw material by the pressurizing device, the heating surface is pressed upon the surface of the raw material to generate a pre-compressed pre-heated raw material surface. The pressurizing device can include at least one of the heating surface or the heating device.

According to an embodiment, the heat exchange unit can include a temperature homogenization box. The temperature homogenization box can be arranged between the energy beam generation unit and the raw material container when the additive manufacturing device is in operation. The heat source can be arranged between the energy beam generation unit and the raw material container.

The temperature homogenization box can comprise a wall which delimits a channel formed by the wall, whereby the wall has a first wall edge and a second wall edge. The second wall edge is arranged oppositely to a raw material surface. The temperature homogenization box can be configured to receive a heat source or can be arranged next to a heat source. The heat source can be disposed inside the channel. The heat generated by the heat source is transferred to the cross-sectional area delimited by the second wall edges in such a way that a homogeneous temperature distribution in this cross-sectional area is obtained. The homogeneous temperature distribution is also transferred to any cross-sectional surfaces arranged below the second wall edges. A raw material exposed to the heat generated inside the wall edges therefore is heated uniformly such that a homogeneous temperature distribution on the raw material surface results from the uniform heating. The raw material surface is thus heated in a homogeneous manner over the cross-sectional surface corresponding to cross-sectional area of the box wall edges. The difference between the maximal temperature in the cross-sectional area and the minimal temperature in the cross-sectional area is not more than 15 degrees Celsius if a temperature homogenization box is used.

According to an embodiment the temperature homogenization box comprises a wall which delimits a channel such that the channel is at least partially enclosed laterally by the wall. In particular, the channel can be hollow, thus the channel is free from insert elements. Such insert elements can include any part selected from the group of baffles, louvers, guide elements, separation elements, shadow-generating elements. In particular, no insert elements are arranged in the channel. In particular, no shadow-generating elements are arranged in the channel. If the channel is hollow, the path for the energy beam is not obstructed by any insert element. The heat flow can be particularly uniform as the surface of the channel walls is homogeneous if it is free from any insert elements. In particular, the cross-sectional surface of the channel can be constant. In particular, the cross-sectional surface of the first wall edge can be substantially the same as the cross-sectional surface of the second wall edge.

The wall can comprise a black inner wall surface to increase heat absorption effects. A black inner wall surface also prevents contaminations from becoming apparent rapidly. A black inner wall surface is thus least less susceptible to any perception of a degradation of the additive manufacturing device caused by contaminants.

The energy generation unit can comprise a housing, whereby the temperature homogenization box is attachable to the housing. In particular, the housing can comprise a door, whereby the temperature homogenization box is attachable to the door. The temperature homogenization box can include an attachment element, such as a hook. The attachment element is suitable for attaching the temperature homogenization box removably or permanently to the housing, in particular the housing wall, which can be a portion of a door.

According to an embodiment, the wall has a first wall edge and a second wall edge, whereby in the operative state, the second wall edge is configured to face a raw material surface of a raw material container.

According to an embodiment, the temperature homogenization box is configured to receive the heat source whereby the heat generated by the heat source is transferred to the cross-sectional area delimited by the second wall edges in such a way that a homogeneous temperature distribution in the cross-sectional area is obtained. By arranging the heat source on top of or inside the temperature homogenization box, the heat can be directed precisely onto the raw material surface. The distance between the second wall edge and the raw material surface is to be kept as small as possible whereby the homogeneous temperature distribution in the cross-sectional area which is delimited by the second wall edge can be transferred directly onto the raw material surface. The difference between the maximal temperature in the cross-sectional area and the minimal temperature in the cross-sectional area is not more than 15 degrees Celsius in a preferred configuration.

According to an embodiment, the temperature homogenization box is arranged between the heat source and the raw material container. This embodiment allows for a particular simple and light-weight construction of the temperature homogenization box.

According to an embodiment, at least one of the walls of the temperature homogenization box comprises an aperture. The aperture can be used as a viewing window. The aperture can be configured as a plurality of holes or slit-like openings. The apertures can be covered by a transparent layer, e.g. a foil or a glass plate to prevent air passing through the apertures.

According to an embodiment at least one of the walls of the temperature homogenization box is disposed with a wing element. The wing element is according to an embodiment configured as a plate element. The plate element can be arranged in a substantially horizontal direction substantially parallel to the raw material surface. The wing element is arranged in such a way that it covers not only the raw material surface of raw material chamber but also the raw material supply container of the additive manufacturing device. According to an embodiment the wing element can comprise a heat source. The heat source can be arranged above the raw material supply container or the raw material chamber. The raw material can according to this embodiment be pre-heated before being transferred to the raw material container.

The cross-sectional surface of the channel can correspond to the cross-sectional surface of the raw material container. Thereby the cross-sectional surfaces of the channel and the raw material container match, which allows for an optimized and uniform heat transfer from the channel to the raw material surface. In case a plurality of raw material containers is used, a plurality of corresponding channels can be provided.

According to an embodiment, the raw material comprises a powder. The powder can contain a polymer, in particular a polyamide with a surface melting temperature greater than 170 degrees Celsius at ambient pressure conditions, which undergoes a sintering process upon exposure to the laser beam. The powder can contain one compound of the group of a polycarbonate (PC), a polymethylmethacrylate (PMMA), a polystyrene (PS), a high-density polyethylene (PE-HD), a polyamide (PA) or a polyaryletherketone (PEEK). In particular, the powder can contain one of the compounds of the group of a PA11 or PA12 or PEEK. The powder can contain pigments or other additives in particular for enhancing light absorption. The powder can in particular contain carbon black. Furthermore, the powder can contain a metal, e.g. aluminum. The powder can contain a ceramics material. The powder can contain at least one of a biological material, a material generated from renewable resources, or an edible material.

The additive manufacturing device according to any of the preceding embodiments can be used for manufacturing a solid article, in particular a solid polymeric article.

The polymer can comprise at least one element of the group of polyurethane (PUR), polyethylene (PE), polypropylene (PP), polyoxymethylene (POM), polymethacrylate, polymethylmethacrylate (PMMA), polyamide, polyolefin, polystyrene, styrene co-polymer, polycarbonate, polysulfone, polyethersulfone, polyketone, polyimide, polyetherketone, polyetheretherketone (PEEK), polyphenylensulfide, polyester, polyethylene terephthalate (PET), polyethylene naphthalate (PEN), polybutylene terephthalate (PBT), polyethylene oxide, cyclic olefinic polymer, polymers containing fluor, such as polyvinylidene fluoride (PVDF), or polytetrafluoroethylene (PTFE), silicone, polylactide, thermoplastic elastomers.

The polymer can comprise an absorbing additive, such as silicon dioxide, titanium dioxide, calcium carbonate, aluminum oxide, carbon black, color agents.

The polymer may comprise a laser-sensitive additive, such as indium oxide, tin oxide, indium-tin oxide or antimony-tin oxide or lanthanum hexaboride. In particular, the laser sensitive additive can comprise nano particles of at least one of the additives mentioned above. A nano particle is characterized by a particle size of less than 1 micrometer. In particular, the particle size of the nano particle can be 1 up to and including 500 nanometers. The nanoparticles can comprise about 0.0001 to 0.1 weight percent of the polymer. The polymer can contain borides to improve laser welding capability.

According to an embodiment, the beam generation unit is movable. Thereby the position of the beam on the directing unit can be varied. The movement of the beam generation unit can be controlled by the control unit. In particular, the control unit can control the movement of the beam generation unit in accordance with a model of the solid article stored in a storage unit. The dimensions of the model of the solid article are transformed into a path of motion of the beam generation unit. Thereby the position of beam on the directing unit is varied which results in a variation of the position of the deflected beam on the raw material surface or the preheated raw material surface.

According to an embodiment, the directing unit is movable. The beam generation unit can remain in a fixed position or can be movable together with or independently of the directing unit. The movement of the directing unit can be controlled by the control unit. In particular, the control unit can control the movement of the directing unit in accordance with a model of the solid article stored in a storage unit. The dimensions of the model of the solid article are transformed into a path of motion of the directing unit. Thereby the position of beam on the directing unit is varied which results in a variation of the position of the deflected beam on the raw material surface or the preheated raw material surface.

According to an embodiment the directing unit comprises a first redirection element and a second redirection element. In particular, at least one of the first redirection element and the second redirection element is movable. The directing unit can comprise a mirror of polygonal shape, i.e. a polygonal mirror. The polygon can be a hexagon or any polygon with more two faces. The mirror of polygonal shape can be rotatable. Thereby the position of the beam on the second redirection element can be changed, which results in a variation of the position of the deflected beam on the raw material surface or the preheated raw material surface. At least one optical element, such as a lens, can be foreseen in the path of the beam between the beam generation unit and the directing unit. Furthermore, one or more optical elements can be provided in the path of the beam from the second redirection element to the heating element and/or the raw material surface.

Furthermore, the objective problem of the invention is solved by a method for operating an additive manufacturing device for manufacturing a solid article by an additive manufacturing method. For performing the method an additive manufacturing device is used, which comprises energy generation unit and a raw material processing unit. The raw material processing unit is connected to the energy generation unit before the additive manufacturing of a solid article is initiated. As soon as the raw material processing unit is attached to the energy generation unit, the additive manufacturing method can be performed.

The raw material processing unit can move freely in any direction when not connected to the energy generation unit.

When performing the additive manufacturing method, the raw material processing unit, in particular comprising a build unit, a raw material container unit and a raw material processing unit, is placed in a manufacturing position by attaching the raw material processing unit to the energy generation unit.

The raw material container unit comprises the raw material container containing a raw material for the manufacture of a solid article. The build unit receives the raw material from the raw material container, whereby the raw material distribution unit transports a portion of the raw material from the raw material container to the build unit. The raw material container comprises a raw material chamber of variable volume, whereby the raw material chamber comprises a raw material chamber bottom, whereby the raw material chamber bottom is connected to a raw material container drive unit. The drive unit moves the raw material chamber bottom to change the volume of the raw material chamber when in operation. The build unit comprises a recipient of variable volume which receives the portion of the raw material from the raw material container. The build unit comprises a recipient bottom connected to a drive unit. The drive unit moves the recipient bottom to change the volume of the recipient.

The recipient containing a raw material and having a raw material surface forming a first layer which can be exposed to a beam emitted by the beam generation unit and heat source for heating the raw material surface. The heat source can include a heating surface for heating the surface of the raw material in the raw material container.

The raw material can be pre-heated by the thermal energy generated by the heating surface to from a pre-heated raw material surface. Subsequently, a beam is generated by the beam generation unit. A directing unit directs the beam emitted by the beam generation unit onto the pre-heated raw material surface. The beam is directed over the pre-heated raw material surface according to a computer-generated model of the solid article stored in a storage unit associated with a control unit for controlling the operation of the beam generation unit. The beam is directed through the heating surface onto the pre-heated raw material surface such that a first solid layer portion of the solid article is obtained when directing the beam onto the pre-heated raw material surface. In at least one subsequent step, a second layer of the raw material is supplied from the raw material supply unit and deposited on top of the first layer. In at least one optional further subsequent step, the operations performed in the previous steps are repeated, until the solid article is obtained.

By directing the beam onto the pre-heated raw material surface the raw material can be sintered or melted in at least in a region covered by a spot of the pre-heated raw material surface exposed to the beam. The melted or sintered region is subsequently solidified, whereby the term subsequently in this context means: after termination of the exposure of the region to the beam.

After completion of the manufacture of the solid article, the raw material processing unit can be decoupled or disconnected from the energy generation unit. The raw material processing unit can be moved to another location. In particular, the recipient containing the solid article can be extracted from the raw material processing unit and the remaining raw material can be separated from the solid article. The solid article extraction step can be performed automatically, in particular by making use of robots. Alternatively, the solid article may be extracted from the recipient without removing the recipient from the raw material processing unit. Any raw material remaining in the recipient can be removed by blowing or sucking the raw material from the recipient.

According to a method variant the beam supplied by the beam generation unit is moved across the raw material surface by moving the beam generation unit. According to a method variant the beam supplied by the beam generation unit is moved across the raw material surface by moving the directing unit. Advantageously, the angle of the beam relative to the raw material surface or the pre-heated raw material surface is 90 degrees with a deviation of not more than 20 degrees, advantageously not more than 10 degrees, most preferred not more than 5 degrees.

According to a method variant the beam supplied by the beam generation unit is moved across the raw material surface by moving the directing unit and the beam generation unit.

According to any of the preceding variants, the control unit can control the movement of the beam generation unit and/or the directing unit in accordance with a model of the solid article stored in a storage unit. The dimensions of the model of the solid article are transformed into a path of motion of the beam generation unit and/or the directing unit. Thereby, the position of beam on the directing unit is varied which results in a variation of the position of the deflected beam on the raw material surface or the preheated raw material surface.

The beam can be exposed for a period of less than a millisecond at a spot and subsequently directed to an adjacent spot for sintering or melting the pre-heated raw material surface at the adjacent spot. In particular, the beam proceeds at a speed of at least 500 mm/s, in particular at least 1000 mm/s, preferably at least 1800 mm/s, particularly preferred at least 10000 mm/s over the pre-heated raw material surface. In particular, the temperature at the spot is at least 0.5° C. above the temperature of the pre-heated raw material surface.

According to an embodiment, the raw material contains a powder. By directing the beam onto the pre-heated raw material surface the raw material can be sintered or melted at least in a region covered by the spot of the pre-heated raw material surface exposed to the beam.

According to another embodiment, the raw material can be liquid or a slurry. By directing the beam onto the pre-heated raw material surface the raw material can be solidified at least in a region covered by the spot of the pre-heated raw material surface exposed to the beam. In particular, a chemical reaction can be initiated by exposing the pre-heated raw material to the beam.

According to an embodiment, the beam is exposed for a period of less than a second at a spot and subsequently directed to an adjacent spot for sintering or solidifying the pre-heated raw material surface at the adjacent spot.

Advantageously, the temperature at the spot is at least 0.5° C. above the temperature of the pre-heated raw material surface. Thereby a solidification, a melting or a sintering process can take place, which at least partially creates a bond between adjacent particles to form a solid surface to generate a solid article within the raw material.

The heating device according to any of the embodiments is thus suitable for an additive manufacturing application, in particular of a selective laser sintering application. Advantageously the temperature of the raw material surface, in particular the powder bed serving as a source for modelling the solid article can be kept substantially uniform over the entire surface of the raw material surface. The additive manufacturing device according to any of the embodiments thus works with a precise raw material surface temperature having a temperature variation with respect to the target temperature of not more than +/−3 degrees Celsius, preferably not more than +/−2 degrees Celsius, particularly preferred not more than +/−1 degrees Celsius.

Thereby, the quality of the solid article can be improved in an unexpected and thus surprising manner and the characteristics of the solid article become more predictable. Consequently, it is possible to dispense with the individual tests which are currently required for each manufactured solid article to ensure that the solid article meets the required specifications if manufactured according to any of the prior art methods currently available.

The raw material processing unit according to any of the preceding embodiments is movable from the additive manufacturing device to a post-processing station for extraction of the manufactured article or for recycling the superfluous raw material. A plurality of post-processing stations can be provided to perform one or more of these steps contemporaneously.

The raw material processing unit thus forms a unit in which all processes entailing the use of the raw material are performed. In other words, the manipulation of the raw material occurs only in the raw material processing unit. Thereby, all raw material related operations can be entirely separated from the beam generating unit. This has the advantage, that the operation of the beam generating unit can be separated from the raw material processing steps, which reduces contamination of the beam generating unit by any raw material processing. In addition the beam generation unit can be used for different raw materials as there is a low risk of cross-contamination involved if the raw material processing unit can be entirely removed from the beam generation unit. It is possible to switch between different raw materials for the manufacture of different solid articles.

The raw material processing unit according to any of the embodiments may be used for recycling a raw material in an added manufacturing method.

The use of the raw material processing unit of one of the preceding embodiments for recycling a spent raw material from a build unit to a raw material container unit of an additive manufacturing device for a solid article manufactured by the additive manufacturing device comprises the raw material container unit and the build unit and a raw material distribution unit. The raw material container unit comprises a raw material container and the build unit comprises a recipient. The raw material distribution unit is configured to transfer the spent raw material from the recipient to the raw material container or a sieved raw material from a raw material disposal unit. When in operation, the solid article is removed from the recipient and the solid article is separated from the spent raw material in the recipient after the manufacture of the solid article has been completed. The spent raw material is transferred from the recipient to the raw material container by the raw material distribution unit.

According to an embodiment the raw material container contains the raw material for the manufacture of the solid article. In operation, the build unit receives the raw material from the raw material container. A raw material distribution unit transports a portion of the raw material from the raw material container to the build unit, wherein the raw material container comprises a raw material chamber of variable volume and a raw material chamber bottom, wherein the raw material chamber bottom can be connected to a raw material container drive unit to move the raw material chamber bottom to change the volume of the raw material chamber. The build unit comprises a recipient of variable volume configured to receive the portion of the raw material from the raw material container, wherein the build unit comprises a recipient bottom which can be connected to a build unit drive unit to move the recipient bottom to change the volume of the recipient.

In operation a layer of the raw material can be added on top of the spent raw material or sieved raw material in the respective raw material container, thereby providing an alternating sequence of the raw material and the spent raw material or the sieved raw material to the raw material container whereby the spent raw material or the sieved raw material is mixed with the raw material.

A method for recycling a spent raw material from a build unit to a raw material container unit of an additive manufacturing device comprises the subsequent steps: a solid article is manufactured by the additive manufacturing device comprising the raw material container unit and the build unit and a raw material distribution unit. The raw material container unit comprises a raw material container and the build unit comprises a recipient. The raw material distribution unit is configured to transfer the raw material from the raw material container to the recipient. After the manufacture of the solid article is completed, the solid article is removed from the recipient and the solid article is separated from the remaining raw material in the recipient. The remaining raw material can be transferred from the recipient to the raw material container by the raw material distribution unit. Alternatively or additionally, the raw material distribution unit is configured to transfer the spent raw material from the recipient to the raw material container or a sieved raw material from a raw material disposal unit.

According to an embodiment, the raw material container contains the raw material for the manufacture of the solid article, wherein the build unit receives the raw material from the raw material container, wherein a raw material distribution unit transports a portion of the raw material from the raw material container to the build unit, wherein the raw material container comprises a raw material chamber of variable volume and a raw material chamber bottom, wherein the raw material chamber bottom can be connected to a raw material container drive unit to move the raw material chamber bottom to change the volume of the raw material chamber, wherein the build unit comprises a recipient of variable volume configured to receive the portion of the raw material from the raw material container, wherein the build unit comprises a recipient bottom which can be connected to a build unit drive unit to move the recipient bottom to change the volume of the recipient.

According to an embodiment the remaining raw material is distributed to a first and a second raw material container by the raw material distribution unit.

According to an embodiment a layer of the raw material is added on top of the spent raw material or the sieved raw material in the respective raw material container, thereby providing an alternating sequence of the raw material and the spent raw material or the sieved raw material to the raw material container whereby the spent raw material or the sieved raw material is mixed with the raw material.

In particular, the recipient can be lifted stepwise for providing a layer of the spent raw material to the raw material container. The method is advantageously carried out in such a way, that a layer of the spent raw material is followed by a layer of raw material. The raw material can be provided by a raw material supply device.

According to an embodiment, any spent raw material from the recipient or the raw material container or the plurality of raw material containers can be removed prior to its recycling. According to an embodiment, the spent material in the recipient may be subjected to a sieving operation. Therefore a sieve element can be placed on the opening of the raw material container or at least one of the first or second raw material containers. The sieve element is configured to cover the respective opening of the respective raw material container.

In operation, the recipient of the build unit is positioned in its lowermost position by actuating the build unit drive unit. The recipient is filled with spent raw material. The sieve element is placed onto the opening of the raw material chamber of the respective raw material container. The recipient is then lifted in a stepwise manner by the build unit drive unit. After each lifting step, the raw material distribution unit is actuated to pass over the surface of the raw material processing unit in the direction of the raw material container. The spent raw material portion which has been lifted above the surface level of the raw material processing unit is moved by the raw material distribution unit onto the sieve element. The sieve element may be disposed with a vibration generation device. The vibration generation device is configured to induce a vibratory movement of the sieve element or a portion thereof.

The raw material chamber bottom may be in the lowermost position or may be lowered stepwise by the raw material container drive unit. The sieved spent raw material is collected in the raw material chamber either for the manufacture of another solid article or may also be removed from the raw material container, e.g. by a suction device to be deposited in a storage container for later use.

According to an embodiment, the raw material processing unit can be configured to move autonomously. The raw material processing unit comprises a housing for the raw material container unit, the build unit and the raw material distribution unit. Transport elements, for example wheels, are provided on the underside of the housing for moving the raw material processing unit freely on a floor or other surface. The raw material processing unit is removably connectable to the energy generation unit and freely movable in any direction when not connected to the energy generation unit. The raw material processing unit is movable from the additive manufacturing device to a post-processing station for extraction of the manufactured article or for recycling the superfluous spent raw material. A plurality of post-processing stations can be provided to perform one or more of these steps contemporaneously.

The raw material processing unit according to any of the embodiments can comprise transport device including a drive unit and the transport element or the plurality of transport elements. The drive unit can be configured to actuate the transport element so as move the raw material processing unit on a surface, such as a floor. The raw material processing unit can comprise a navigation system or can be connectable to a navigation system for moving between a storage position, the additive manufacturing device or a post-processing station. The raw material processing unit can comprise a control unit. The control unit can receive positional information from the navigation system. The control unit can be installed locally on the raw material processing unit. The control unit can obtain status information of the raw material processing unit. The status information can comprise the type of raw material used with this raw material processing unit, the amount of raw material stored in the raw material processing unit, the percentage of recycled raw material used, the age of the raw material. A storage unit can be provided for storing the status information or the positional information obtained by the control unit.

The raw material processing unit can be connectable to a control system. The control system can be a central control system for controlling the operation of the additive manufacturing device, all post processing stations and all raw material processing units. In particular, the control unit can exchange data with the control system, such as positional information or status information of the raw material processing unit. The control system can be configured to transmit a command to the control unit. A command may include a request to the control unit to provide the actual status information of the raw material processing unit. A command may include a request to the control unit to provide positional information of the raw material processing unit. A command may include a request to the control unit to change the position of the raw material processing unit. The control unit may be configured to actuate the drive unit to start or stop the transport device. The control unit may be configured to direct the transport device in any desired direction on a two-dimensional surface by a direction unit. If the direction of the transport device is changed by the direction unit, the raw material processing unit moves into the changed direction as determined by the direction unit.

A substantial advantage of providing a control unit which can communicate with a control system is the reduction of manual handling operations. Thus, the standard manufacturing operations of the additive manufacturing device and the preparation of the raw material processing unit for the additive manufacturing process and recycling of spent raw material after completion of the additive manufacturing process may be performed without human or robot interference. The respective raw material processing unit can thus be commanded by the central system to the additive manufacturing device to be coupled to the additive manufacturing device or decoupled therefrom. The status information in the control unit can be compared to the manufacturing plan of the additive manufacturing device. If the status information of the control unit of the respective raw material processing unit corresponds with the manufacturing plan of the additive manufacturing device the manufacture of a solid article may be initiated. After completion of the additive manufacturing process, the raw material processing unit can be decoupled from the additive manufacturing device. The control system can receive an update of the status information from the control unit. The control unit can be configured to interact with the additive manufacturing device to exchange information on the progress of the article to be manufactured by the additive manufacturing process. Alternatively or additionally the control system can be configured to interact with the additive manufacturing device to exchange information on the progress of the article to be manufactured by the additive manufacturing process.

The control system can transmit a command to the control unit of the material processing unit to be moved to a post-processing station after the manufacture of the article has been completed. Contemporaneously, the control system can transmit a command to another control unit of another material processing unit to be moved to the additive manufacturing device. Thereby, the production capacity of the additive manufacturing device can be optimized. Any pre-processing or post-processing steps can be performed at different locations, therefore the additive manufacturing device can be used for quasi-continuous production for 24 hours a day for all 7 days of any week. If the control system is configured to control the manufacturing process as well as any pre- or post-processing steps thereof, no human interaction may be required.

The control unit can include a unique identification code. Thereby the status and positional information of any raw material processing unit in the production system is known to the control unit and the control system. The unique identification code ensures that only the required raw material processing units are in use and that all of these raw material processing units comply with certain standards. The attribution of the unique identification code to the raw material processing unit makes it impossible to replace a raw material processing unit by any non-standardized raw material processing unit or any raw material processing unit resulting from any replacement or refurbishing operation which does not comply with the standard. In addition the control system can detect any fake raw material processing unit introduced into the system. No unauthorized copies may thus be admitted into the system. Furthermore the control unit may register any unauthorized tampering and prevent any raw material processing unit, which has been manipulated by unauthorized tampering, is admitted again into the additive manufacturing process.

If the control system is configured to check the status information of any raw material processing unit anytime, errors, such as the use of the wrong raw material processing unit for an additive manufacturing process, the application of wrong temperatures or pressures can be excluded.

If the term «for instance» is used in the following description, the term relates to embodiments or examples, which is not to construed as a more preferred application of the teaching of the invention. The terms "preferably" or "preferred" are to be understood such that they relate to an example from a number of embodiments and/or examples which is not to construed as a more preferred application of the teaching of the invention. Accordingly, the terms "for example", "preferably" or "preferred" may relate to a plurality of embodiments and/or examples.

The subsequent detailed description contains different embodiments of the raw material processing unit or the additive manufacturing device according to the invention. The raw material processing unit or the additive manufacturing device can be manufactured in different sizes making use of different materials, such that the reference to a specific size or a specific material is to be considered to be merely exemplary. In the description, the terms «contain», «comprise», «are configured as» in relation to any technical feature are thus to be understood that they contain the respective feature but are not limited to embodiments containing only this respective feature.

BRIEF DESCRIPTION OF THE DRAWINGS

A number of embodiments of the invention are shown in the subsequent drawings. It is shown in FIG. 1 a section through an additive manufacturing device according to an embodiment of the invention, FIG. 2 a raw material processing unit according to a first embodiment of the invention, FIG. 3 a section through a raw material processing unit according to a second embodiment of the invention, FIG. 4 a top view on the raw material processing unit of FIG. 3, FIG. 5 a section through a raw material processing unit showing the recycle of the raw material, FIG. 6 a top view on a raw material processing unit according to a third embodiment, FIG. 7 a section through a raw material processing unit of FIG. 7 showing the manufacture of a solid article, FIG. 8 a section through a raw material processing unit of FIG. 7 showing the recycle of the raw material, FIG. 9 a top view on a raw material processing unit according to a third embodiment, FIG. 10 a section through a raw material processing unit of FIG. 9 the recycle of the raw material, FIG. 11 a section through a raw material processing unit of FIG. 9 showing a mixing process for the raw material.

DETAILED DESCRIPTION

Figure 1:
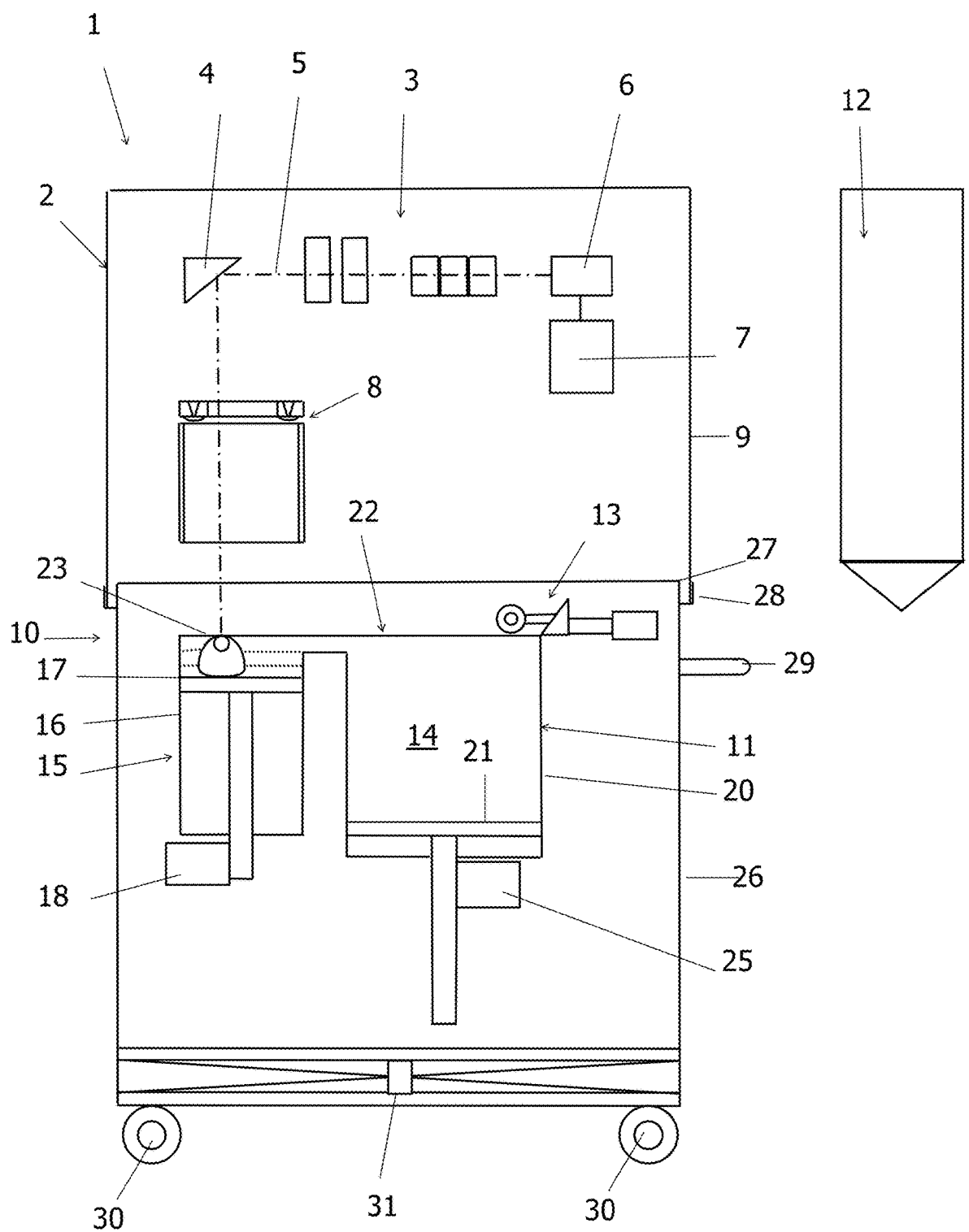

FIG. 1 shows an additive manufacturing device 1 according to an embodiment of the invention. The additive manufacturing device 1 for manufacturing a solid article comprises an energy generation unit and a raw material processing unit 10. The energy generation unit 2 comprises an energy beam generation unit 3. The raw material processing unit 10 comprises a raw material container unit 11, a build unit 15 and a raw material distribution unit 13. The raw material container unit 11 comprises a raw material container 14 containing a raw material 22 for the manufacture of a solid article 23. The build unit 15 is configured to receive the raw material 22 from the raw material container 14. The raw material distribution unit 13 is configured to transport a portion of the raw material 22 from the raw material container 14 to the build unit 15. The raw material container 14 comprises a raw material chamber 20 of variable volume, whereby the raw material chamber 20 comprises a raw material chamber bottom 21. The raw material chamber bottom 21 is connected to a raw material container drive unit 25 for moving the raw material chamber bottom 21 to change the volume of the raw material chamber 20 when in operation.

The build unit 15 comprises a recipient 16 of variable volume configured to receive the portion of the raw material 22 from the raw material container 14. The build unit 15 comprises a recipient bottom 17 connected to a drive unit 18 for moving the recipient bottom 17 to change the volume of the recipient 16 when in operation.

The raw material processing unit 10 comprises a housing for the raw material container unit 11, the build unit 15 and the raw material distribution unit 13. Wheels 30 are provided on the underside of the housing 19 for moving the raw material processing unit freely on a floor. The raw material processing unit 10 is removably connectable to the energy generation unit 2 and freely movable in any direction when not connected to the energy generation unit 2.

According to this embodiment, the housing 19 includes a circumferential wall 26. The circumferential wall 26 comprises a wall edge 27, whereby the wall edge 27 can comprise an engagement mechanism 28 for connection with an energy generation unit of the additive manufacturing device for manufacturing a solid article. The engagement mechanism 28 can comprise one of a hook, a groove, a snap-fit mechanism.

The raw material processing unit can further comprise a manipulation element 29, such as a handle for moving the raw material processing unit.

The raw material processing unit can also comprise a level adjustment mechanism 31. The level adjustment mechanism 31 can be used to adjust the raw material processing unit 10 in height such that when the raw material processing unit 10 and the energy generation unit are connected, a sealing effect is obtained to prevent heat and/or raw material loss when performing an additive manufacturing method.

The additive manufacturing device 1 is shown in a schematic view in section. The additive manufacturing device 1 can include a heat exchange unit 8, which can comprise a heat source for heating a raw material 22 provided in the recipient 16. The solid article 23 is generated by an additive manufacturing method in the recipient 16. The additive manufacturing device 1 comprises an energy beam generation unit 3, in particular a diode laser generation unit. A raw material supply unit 12 can be provided for supplying raw material to the raw material container 14 containing the raw material 22 to be used for manufacturing the solid article 23.

The raw material 22 has a raw material surface exposed to an energy beam 5 emitted by the energy beam generation unit 3 when in operation. The energy beam 5 is directed onto the raw material surface. The raw material 22 is heated at the raw material surface in any location which is exposed to the energy beam 5. The energy beam 5 usually melts the raw material 22 at the raw material surface whereby a coherent sub-structure is formed. The coherent sub-structure at the portion of the raw material which is impinged by the energy beam 5 differs from the raw material, which is usually in a flowable state, that can be one of a powder or a liquid or any combination of liquid and powder such as a slurry. This coherent sub-structure solidifies as soon as the energy beam 5 is redirected onto another location or spot of the raw material surface. The coherent sub-structure adheres also to any coherent sub-structure present below the raw material surface e.g. in a previously applied layer of raw material which had been exposed to the energy beam 5 in a previous process sequence.

The operation of the energy beam 5 is controlled by a control unit 6. The energy beam generation unit 3 is disposed with a directing unit 4 to direct the energy beam 5 onto the raw material surface according to a computer-generated model of the solid article 23 stored in a storage unit 7 associated with the control unit 6. Thereby, the operation of the directing unit 4 is controlled by the control unit 6. The energy beam 5 generated by the energy beam generation unit 3 passes through the heat exchange unit 8, which can comprise a heating surface, onto the raw material surface. Thus, the energy beam 5 traverses the heating surface of the heat source. In particular, the heating surface is transparent for an energy beam e.g. of a diode laser. Advantageously the heating surface is transparent for light of a wavelength in a range of 100 nm up to and including 1 mm.

The generation of a solid article 23 by an additive manufacturing method in the additive manufacturing device 1 involves the following steps. A portion of the raw material 22 stored in the raw material container 14 is supplied as a layer of a thickness of less than 1 mm by the raw material distribution unit 13 to the recipient 16. According to a preferred embodiment, the thickness or height of the layer can be about 100 μm.

The raw material supply unit 12 can include a raw material supply container, such as a hopper, which is filled with raw material. The raw material supply container can be movable or can be fixed.

The raw material container 14 includes a raw material container drive unit 25 for moving the raw material chamber bottom 21 of the raw material container 14 upwardly in a stepwise manner. Thereby the raw material 22 for a new layer of raw material to be supplied on top of the raw material surface is provided. For the generation of each new raw material layer, the raw material chamber bottom 21 of the raw material container 14 is moved upwardly in a stepwise manner, such that a portion of the raw material 22 having a volume corresponding to the thickness of a new raw material layer is supplied to the recipient 16 of the build unit 15. The raw material distribution unit 13 can be used to move the portion of the raw material 22 from the raw material container 14 to the recipient 16 of the build unit 15. The raw material chamber 20 of the raw material container 14 is shown in FIG. 1 in section. The front wall of the raw material chamber 20 as well as of the recipient 16 are omitted to show the interior of the raw material chamber 20 and the recipient 16.

The raw material 22 is distributed on the surface of the first or previous layer for which the additive manufacturing method has already been completed.

The raw material distribution unit 13 can be in particular be configured as a roller element or as a sliding element or a combination thereof. The raw material distribution unit 13 can perform a sliding or rolling movement. The raw material distribution unit 13 thereby pushes the volume of raw material supplied for generation of the second or subsequent layer to the build unit 15.

The recipient bottom 17 of the recipient 16 is also movable in a direction normal to the raw material surface. A build unit drive unit 18 is connected to the recipient bottom 17. In particular, the recipient bottom 17 is movable downwardly. Each new layer of each portion of the raw material 22 supplied from the raw material container 14 is deposited on the previous layer and each of the layers contains a portion of the solid article 23 to be manufactured.

The heat exchange unit 8 can comprise a heat source, which can include a heating surface to provide thermal energy to the raw material surface to form a pre-heated raw material surface. The heat source can be of a circular or rectangular cross-section in particular corresponding to the cross-section of the recipient 16 of the build unit 15. The recipient 16 can also be of circular or rectangular cross-section. The heat source can contain an annular heating surface or a heating surface of rectangular cross-section. The heating surface can be transparent to the energy beam 5, such that the energy beam 5 can pass through the heating surface. The heating surface can contain at least one of a radiation heater or a resistance heater. The energy beam 5 generated and emitted by the energy beam generation unit 3 is directed by the directing unit 4 onto the pre-heated raw material surface.

The heat exchange unit 8 can be configured as a temperature homogenization box comprising a wall which delimits a channel such that the channel is laterally at least partially enclosed by the wall. The wall has a first wall edge and a second wall edge, whereby in the operative state, the second wall edge is configured to face the raw material surface of the raw material 22 contained in the recipient 16 of the build unit 15. The temperature homogenization box is attachable to the housing 9 of the energy generation unit 2. The housing 9 can comprise a door which is not shown in the drawings. The door can form one of the side walls of the housing 9 or the ceiling or can comprise a portion of the side walls or the ceiling. The housing 9 can have substantially cubical shape.

Figure 2:
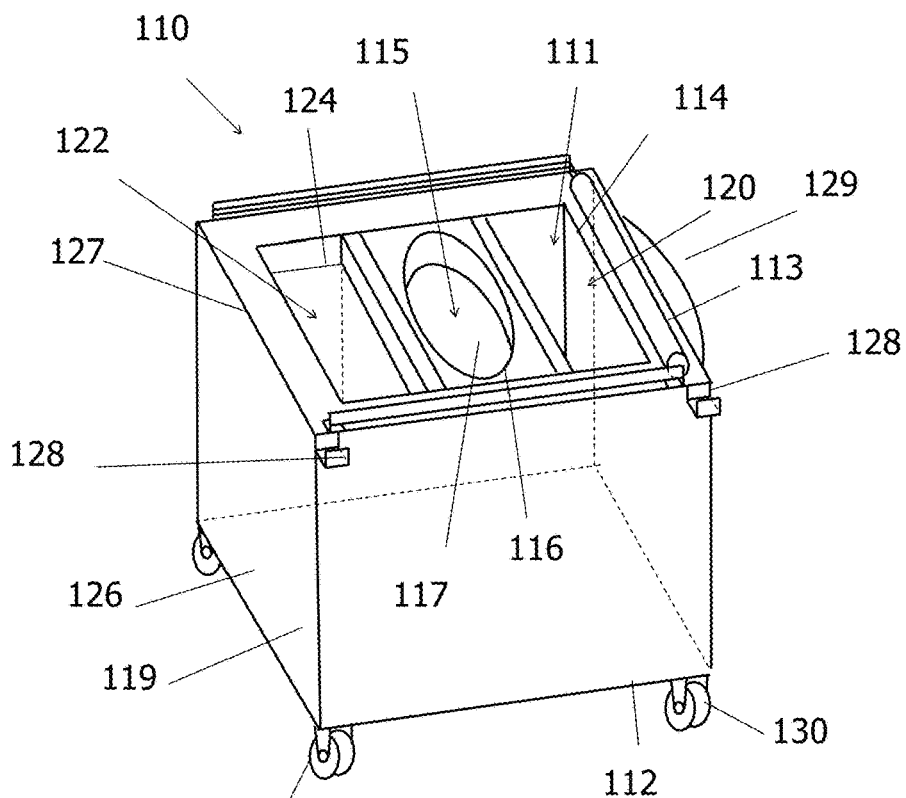

FIG. 2 shows a raw material processing unit 110 according to a second embodiment of the invention. The raw material processing unit 110 can also be used for an additive manufacturing device 1 as shown in FIG. 1 for manufacturing a solid article. The raw material processing unit 110 comprises a raw material container unit 111, a build unit 115 and a raw material distribution unit 113. Furthermore, the raw material processing unit 110 comprises a housing 119 for the raw material container unit 111, the build unit 115 and the raw material distribution unit 113. Wheels 130 are provided on the underside of the housing 119 for moving the raw material processing unit 110 freely on a floor.

Figure 3:
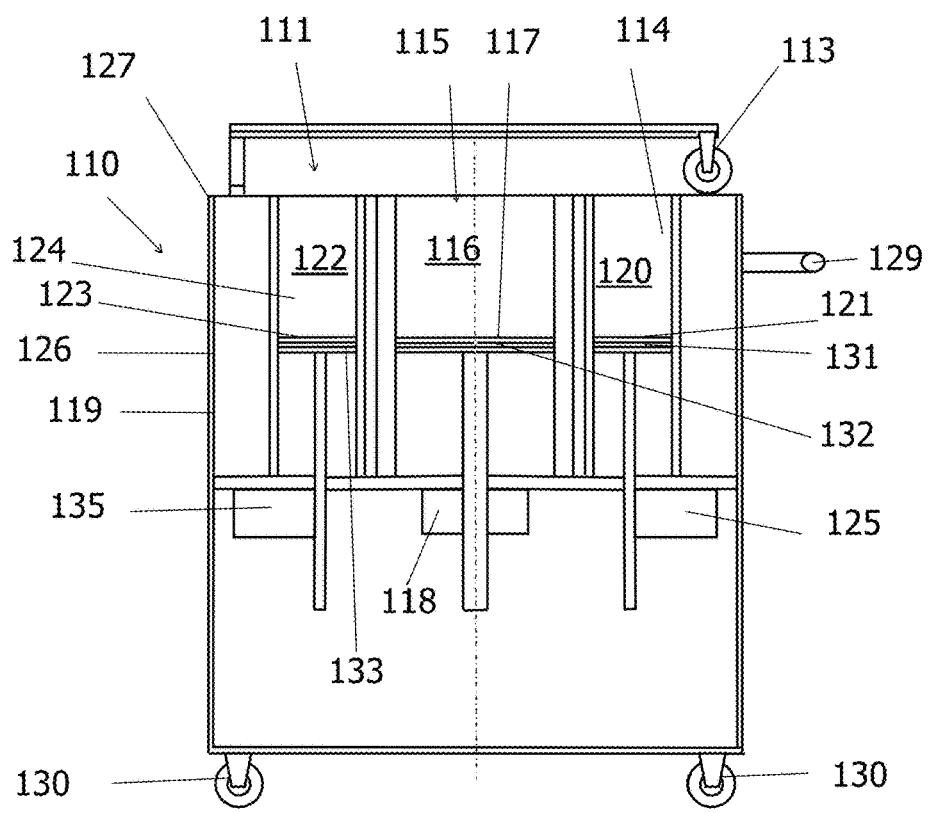

FIG. 3 shows the raw material processing unit 110 of FIG. 2 in section. The raw material container unit 110 comprises, according to the embodiment shown in FIG. 2 or FIG. 3, a first raw material container 114 and a second raw material container 124 configured to contain a raw material 22 for the manufacture of a solid article. The build unit 115 is configured to receive the raw material 22 alternatively from the first raw material container 114 or the second raw material container 124. The raw material distribution unit 113 is configured to transport a portion of the raw material 22 from the first raw material container 114 or the second raw material container 124 to the build unit 115. The first raw material container 114 comprises a first raw material chamber 120 of variable volume. The first raw material chamber 120 comprises a first raw material chamber bottom 121, whereby the first raw material chamber bottom 121 is connected to a first raw material container drive unit 125 for moving the first raw material chamber bottom 121 to change the volume of the first raw material chamber 120 when in operation.

The second raw material container 124 comprises a second raw material chamber 122 of variable volume. The second raw material chamber 122 comprises a raw material chamber bottom 123, whereby the second raw material chamber bottom 123 is connected to a second raw material container drive unit 135 for moving the second raw material chamber bottom 123 to change the volume of the second raw material chamber 122 when in operation.

The build unit 115 comprises a recipient 116 of variable volume configured to receive the portion of the raw material from the raw material container 114, whereby the build unit 115 comprises a recipient bottom 117 connected to a build unit drive unit 118 for moving the recipient bottom 117 to change the volume of the recipient 116 when in operation.

Each of the first and second raw material chamber bottoms 121, 123 and the recipient bottom 117 can be configured as plate-shaped elements. A sealing element 131, 133 can be provided on the circumference of each of the plate-shaped element. The sealing element 131, 133 can be configured as a circumferential or an annular sealing element. A plurality of sealing elements can be arranged parallel to each other on each of the plate-shaped elements. In particular, the first raw material chamber bottom 121 is disposed with a first sealing element 131, the second raw material chamber bottom 123 is disposed with a second sealing element 133. The recipient bottom 117 is disposed with a recipient bottom sealing element 132.

According to this embodiment, the housing 119 includes a wall 126, in particular a circumferential wall. The wall 126 comprises a wall edge 127, whereby the wall edge 127 can comprise an engagement mechanism 128 for connection with an energy generation unit of the additive manufacturing device for manufacturing a solid article, such as the one shown in FIG. 1. The engagement mechanism 128 can comprise one of a hook, a groove, a snap-fit mechanism. The housing 119 is configured to interlock with a corresponding housing 9 for the energy generation unit 2.

The raw material processing unit 110 can comprise a manipulation element 129, such as a handle for moving the raw material processing unit 110. The raw material processing unit 110 of one can also comprise a level adjustment mechanism, however this variant is not shown any of FIG. 2 or 3.

Figure 4:
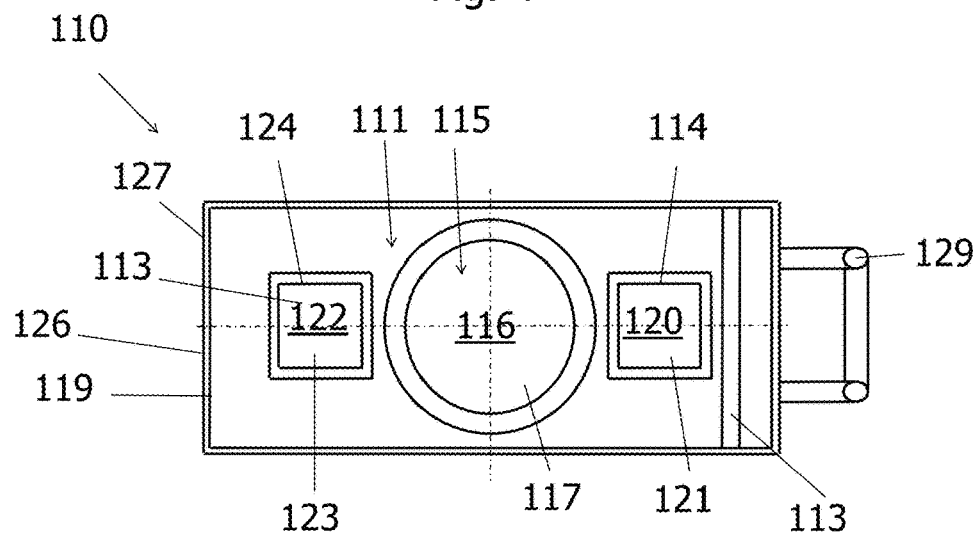

FIG. 4 shows a top view of a raw material processing unit 110 according to one of FIG. 2 or FIG. 3. The raw material container unit 111 comprises a build unit 115 of circular cross-section and a first and second raw material container 114, 124 of rectangular cross-section. By providing a raw material container 114, 124 or alternatively or additionally also a build unit 115 of a rectangular cross-section, a substantial amount of space can be saved. A raw material processing unit 110 containing at least one of the build units 115 or the first and second raw material container 114, 124 of rectangular cross-section is therefore more compact than the prior art variants containing only raw material containers and build units of circular cross-section.

According to any one of the preceding embodiments, of the raw material supply unit 12, the raw material container 14, 114, 124 or the raw material disposal unit, which is not shown in the drawings, are of a circular or rectangular configuration.

According to any one of the preceding embodiments, the housing 19, 119 of the raw material processing unit 10, 110 including the wall 26, 126 and the wall edge 27, 127, whereby in the operative state, the wall edge 27, 127 is configured to be inserted into the housing 9 of the energy generation unit 2, a variant, which is not shown in the drawings.

According to any one of the preceding embodiments, the raw material processing unit is configured such that the raw material supply unit 12 and the raw material container unit are arranged such that raw material can be transferred from the raw material supply unit 12 to the raw material container 14, 114, 124.

According to an embodiment, a displacement mechanism can be provided to lift or lower the bottom surface of the raw material supply unit or the raw material container unit, e.g. a level adjustment mechanism 31. According to an embodiment, a raw material disposal unit is provided configured to receive surplus raw material.

Figure 5:
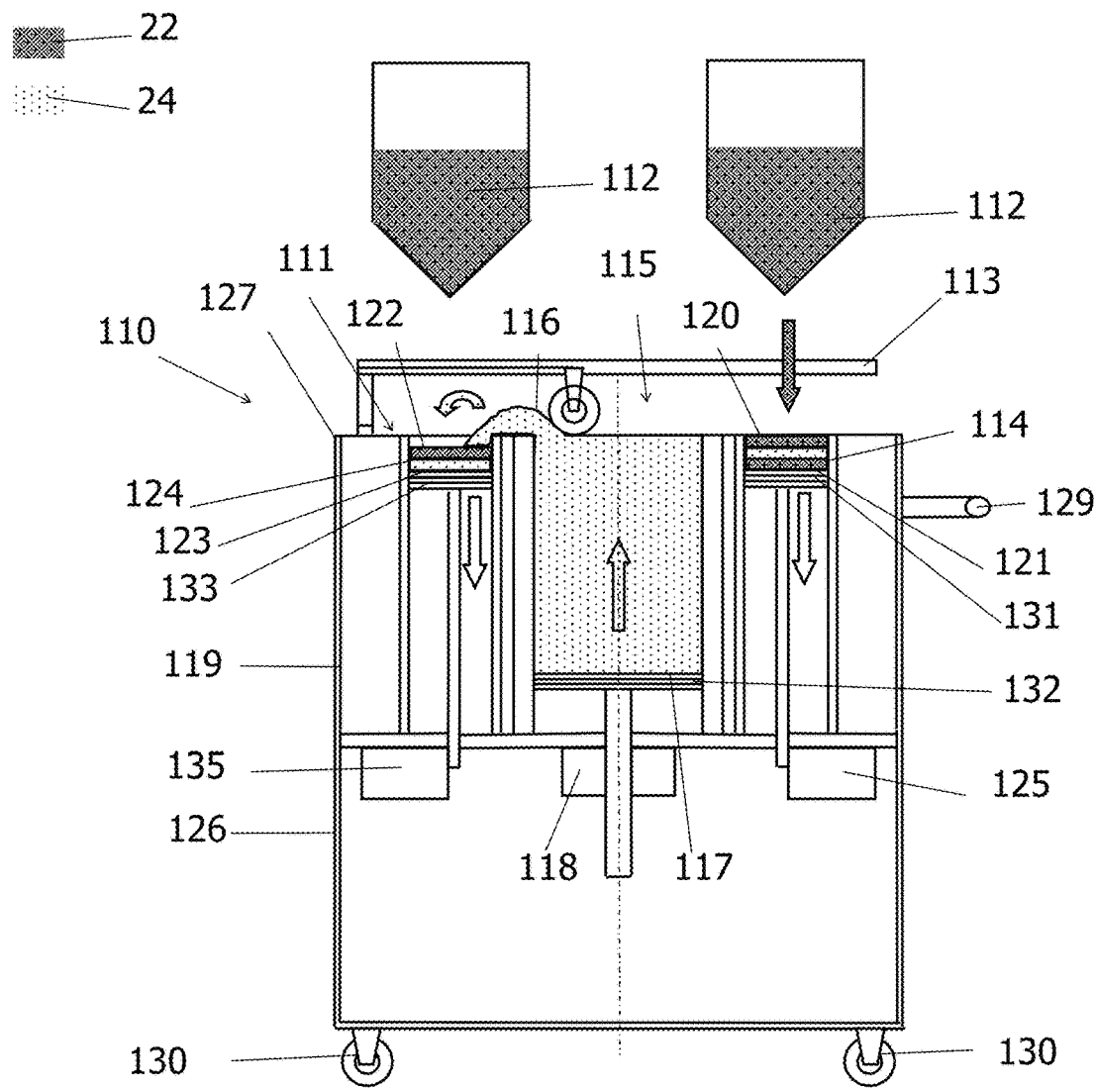

FIG. 5 shows the raw material processing unit 110 of FIG. 2 in section. The recycling of a spent raw material 24 from a build unit 115 to a raw material container unit 111 of an additive manufacturing device 1 includes the following steps. A solid article 23 is manufactured by the additive manufacturing device 1 comprising the raw material container unit 111 and the build unit 115 and a raw material distribution unit 113. The raw material container unit 111 comprises a raw material container 114 and the build unit 115 comprises a recipient 116. The raw material distribution unit 113 is configured to transfer the raw material 22 from the raw material container 114, 124 to the recipient 116. After the manufacture of the solid article 23 is completed, the solid article 23 is removed from the recipient 116 and the solid article 23 is separated from the spent raw material 24 in the recipient 116 wherein the spent raw material 24 is transferred from the recipient 116 to the raw material container 114, 124 by the raw material distribution unit 113. The solid article 23 can be a solid article as shown in FIG. 1. In FIG. 5 the solid article is not shown any more as FIG. 5 shows the situation in which the spent raw material 24 from the build unit 115 is recycled to the first and second raw material containers 114, 124.

According to an embodiment the first raw material container 114 contains raw material 22 for the manufacture of the solid article 23. According to an embodiment the second raw material container 124 also contains raw material 22 for the manufacture of the solid article 23. The build unit 115 receives the raw material 22 from the first and second raw material containers 114, 124, wherein a raw material distribution unit 113 transports a portion of the raw material 22 from the respective first or second raw material container 114, 124 to the build unit 115. The first and second raw material containers 114, 124 each comprise a raw material chamber 120, 122 of variable volume and a respective raw material chamber bottom 121, 123, wherein the raw material chamber bottom 121, 123 can be connected to a respective raw material container drive unit 125, 135 to move the raw material chamber bottom 121, 123 to change the volume of the raw material chamber 120, 122. The build unit 115 comprises a recipient 116 of variable volume configured to receive the portion of the raw material 22 from the first or second raw material container 114, 124, wherein the build unit 115 comprises a recipient bottom 117 which can be connected to a build unit drive unit 118 to move the recipient bottom 117 to change the volume of the recipient 116.

A layer of the raw material 22 can be added on top of the spent raw material in the first or second raw material container 114, 124, thereby providing an alternating sequence of the raw material 22 and the spent raw material 24 to the first or second raw material container 114, 124 whereby the spent raw material 24 is mixed with the raw material 22.

Figure 6:
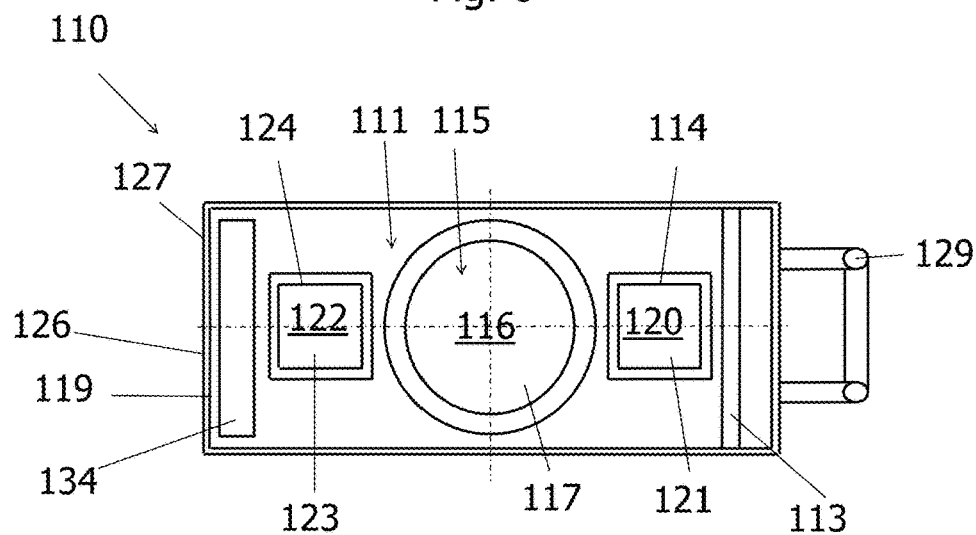

FIG. 6 shows a top view on a raw material processing unit 110 according to a third embodiment similar to one of FIG. 2 or FIG. 3. The raw material container unit 111 comprises a build unit 115 of circular cross-section and a first and second raw material container 114, 124 of rectangular cross-section. By providing a raw material container 114, 124 or alternatively or additionally also a build unit 115 of a rectangular cross-section, a substantial amount of space can be saved. A raw material processing unit 110 containing at least one of the build units 115 or the first and second raw material container 114, 124 of rectangular cross-section is therefore more compact than the prior art variants containing only raw material containers and build units of circular cross-section. Furthermore, an opening 134 can be provided between the second raw material container 122 and the wall 126. Alternatively or additionally, an opening can be provided in the cover of the raw material processing unit 110 between the first raw material container 120 and the corresponding wall, which is not shown in the drawings. The opening 134 is configured to receive any spent raw material 24 from the recipient 116 of the build unit 115 and/or any superfluous raw material 22 from one of the first or second raw material containers 120. The raw material distribution unit 113 may be configured to move any raw material 22 and any spent raw material 24 to the opening 134. The raw material 22 and the spent raw material 24 fall through this opening and accumulate in a raw material disposal unit 33 which is shown in an embodiment in FIG. 7. The cover of the raw material processing unit 110 can thus be cleaned from any raw material 22 or spent raw material 24 accidentally flowing out of any of the first or second raw material containers 114, 124.

According to any one of the preceding embodiments, the raw material supply unit 12, 112 the raw material container 14, 114, 124 or the raw material disposal unit 33, are of a circular or rectangular configuration.

According to any one of the preceding embodiments, the housing 19, 119 of the raw material processing unit 10, 110 includes the wall 26, 126 and the wall edge 27, 127, whereby in the operative state, the wall edge 27, 127 is configured to be inserted into the housing 9 of the energy generation unit 2. The housing 9 is not shown in FIG. 6 or FIG. 7.

Figure 7:
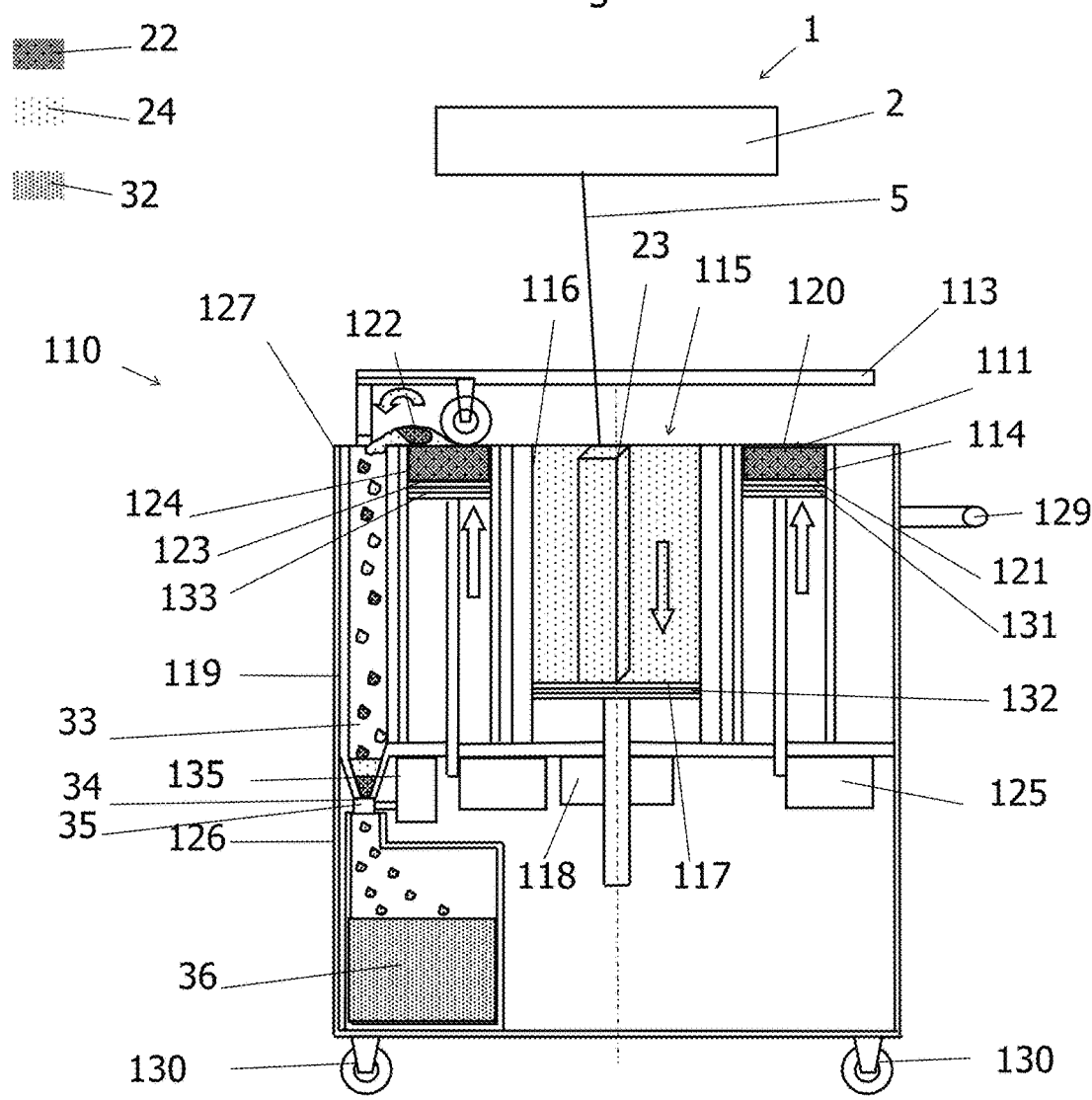

FIG. 7 shows a section through a raw material processing unit of FIG. 7 showing the manufacture of s solid article. FIG. 7 shows thus the additive manufacturing device 1 however, the configuration of the energy generation unit can be such that it is suitable for the combination with the raw material processing unit 110. The additive manufacturing device 1 for manufacturing a solid article thus comprises the energy generation unit 2 and the raw material processing unit 110, when ready for operation or in the operating state. The energy generation unit 2 comprises an energy beam generation unit which can emit an energy beam 5.

The raw material processing unit 110 comprises a raw material container unit 111, a build unit 115 and a raw material distribution unit 113. The raw material container unit 111 comprises a first raw material container 114 containing a raw material 22 for the manufacture of a solid article 23. The raw material container unit 111 comprises a second raw material container 124 containing also raw material 22 for the manufacture of the solid article 23. The build unit 115 is configured to receive the raw material 22 from the first and second raw material containers 114, 124.

The raw material distribution unit 113 is configured to transport a portion of the raw material 22 from at least one of the first or second raw material containers 114, 124 to the build unit 115. The first and second raw material containers 114, 124 comprise a respective first and second raw material chamber 120, 122 of variable volume, whereby the raw material chamber 120, 122 comprises a respective first and second raw material chamber bottom 121, 123. The first and second raw material chamber bottom 121, 123 is connected to a respective first and second raw material container drive unit 125, 135 for moving the corresponding first and second raw material chamber bottom 121, 123 to change the volume of the respective first and second raw material chamber 120, 122 when in operation.

The build unit 115 comprises a recipient 116 of variable volume configured to receive the portion of the raw material 22 from one of the first or second raw material containers 114, 124. The build unit 115 comprises a recipient bottom 117 connected to a drive unit 118 for moving the recipient bottom 117 to change the volume of the recipient 116 when in operation.

The raw material processing unit 110 comprises a housing for the raw material container unit 111, the build unit 115 and the raw material distribution unit 113. Wheels 130 are provided on the underside of the housing 119 for moving the raw material processing unit 110 freely on a floor. The raw material processing unit 110 is removably connectable to the energy generation unit 2 and freely movable in any direction when not connected to the energy generation unit 2.

According to this embodiment, the housing 119 includes a circumferential wall 126. The circumferential wall 126 comprises a wall edge 127, whereby the wall edge 127 can comprise an engagement mechanism for connection with an energy generation unit 2 of the additive manufacturing device for manufacturing a solid article. The engagement mechanism can comprise one of a hook, a groove, a snap-fit mechanism.

The raw material processing unit 110 can further comprise a manipulation element 129, such as a handle for moving the raw material processing unit 110 on the shop floor to any desired location.

The raw material processing unit 110 can also comprise a level adjustment mechanism. The level adjustment mechanism can be used to adjust the raw material processing unit 110 in height such that when the raw material processing unit 110 and the energy generation unit 2 are connected, a sealing effect is obtained to prevent heat and/or raw material loss when performing an additive manufacturing method.

The additive manufacturing device 1 is shown in a schematic view in section. The additive manufacturing device 1 can include a heat exchange unit, which can comprise a heat source for heating a raw material 22 provided in the recipient 116. The heat exchange unit is not shown in FIG. 7. The solid article 23 is generated by an additive manufacturing method in the recipient 116. The additive manufacturing device 1 comprises an energy beam generation unit, in particular a diode laser generation unit.

The raw material 22 has a raw material surface exposed to an energy beam 5 emitted by the energy beam generation unit when in operation. The energy beam 5 is directed onto the raw material surface. The raw material 22 is heated at the raw material surface in any location which is exposed to the energy beam 5. The energy beam 5 usually melts the raw material 22 at the raw material surface whereby a coherent sub-structure is formed. The coherent sub-structure at the portion of the raw material which is impinged by the energy beam 5 differs from the raw material, which is usually in a flowable state, that can be one of a powder or a liquid or any combination of liquid and powder such as a slurry. This coherent sub-structure solidifies as soon as the energy beam 5 is redirected onto another location or spot of the raw material surface. The coherent sub-structure adheres also to any coherent sub-structure present below the raw material surface e.g. in a previously applied layer of raw material which had been exposed to the energy beam 5 in a previous process sequence.

The operation of the energy beam 5 is controlled by a control unit. The energy beam generation unit is disposed with a directing unit to direct the energy beam 5 onto the raw material surface according to a computer-generated model of the solid article 23 stored in a storage unit associated with the control unit. Thereby, the operation of the directing unit is controlled by the control unit. The energy beam 5 generated by the energy beam generation unit passes through the heat exchange unit, which can comprise a heating surface, onto the raw material surface. Thus, the energy beam 5 traverses the heating surface of the heat source. In particular, the heating surface is transparent for an energy beam e.g. of a diode laser. Advantageously the heating surface is transparent for light of a wavelength in a range of 100 nm up to and including 1 mm.

The generation of a solid article 23 by an additive manufacturing method in the additive manufacturing device 1 involves the following steps. A portion of the raw material 22 stored in the first or second raw material container 114, 124 is supplied as a layer of a thickness of less than 1 mm by the raw material distribution unit 113 to the recipient 116. According to a preferred embodiment, the thickness or height of the layer can be about 100 µm.

The first raw material container 114 includes a first raw material container drive unit 125 for moving the first raw material chamber bottom 121 of the first raw material container 114 upwardly in a stepwise manner. The second raw material container 124 includes a second raw material container drive unit 135 for moving the second raw material chamber bottom 123 of the second raw material container 124 upwardly in a stepwise manner. Thereby, the raw material 22 for a new layer of raw material to be supplied on top of the raw material surface is provided. For the generation of each new raw material layer, the first raw material chamber bottom 121 of the first raw material container 114 or the second raw material chamber bottom 123 of the second raw material container 124 is moved upwardly in a stepwise manner, such that a portion of the raw material 22 having a volume corresponding to the thickness of a new raw material layer is supplied to the recipient 116 of the build unit 115. The raw material distribution unit 113 can be used to move the portion of the raw material 22 from one of the first or second raw material containers 114, 124 to the recipient 116 of the build unit 115. The first raw material chamber 120 of the first raw material container 114 and the second raw material chamber 122 of the second raw material container 124 are shown in FIG. 7 in section. The front walls of the first and second raw material chambers 120, 122 as well as of the recipient 116 are omitted to show the interior of the first and second raw material chambers 120, 122 and the recipient 116.

The raw material 22 is distributed on the surface of the first or previous layer for which the additive manufacturing method has already been completed.

The raw material distribution unit 113 can be in particular be configured as a roller element or as a sliding element or a combination thereof. The raw material distribution unit 113 can perform a sliding or rolling movement. The raw material distribution unit 113 thereby pushes the volume of raw material supplied for generation of the second or subsequent layer to the build unit 115.

The recipient bottom 117 of the recipient 116 is also movable in a direction normal to the raw material surface. A build unit drive unit 118 is connected to the recipient bottom 117. In particular, the recipient bottom 117 is movable downwardly. Each new layer of each portion of the raw material 22 supplied from one of the first and second raw material containers 114, 124 is deposited on the previous layer and each of the layers contains a portion of the solid article 23 to be manufactured.

The heat exchange unit can comprise a heat source, which can include a heating surface to provide thermal energy to the raw material surface to form a pre-heated raw material surface. The heat source can be of a circular or rectangular cross-section in particular corresponding to the cross-section of the recipient 116 of the build unit 115. The recipient 116 can also be of circular or rectangular cross-section. The heat source can contain an annular heating surface or a heating surface of rectangular cross-section. The heating surface can be transparent to the energy beam 5, such that the energy beam 5 can pass through the heating surface. The heating surface can contain at least one of a radiation heater or a resistance heater. The energy beam 5 generated and emitted by the energy beam generation unit is directed by the directing unit onto the pre-heated raw material surface.

The heat exchange unit can be configured as a temperature homogenization box comprising a wall which delimits a channel such that the channel is laterally at least partially enclosed by the wall. The wall has a first wall edge and a second wall edge, whereby in the operative state, the second wall edge is configured to face the raw material surface of the raw material 22 contained in the recipient 116 of the build unit 115. The temperature homogenization box is attachable to the housing of the energy generation unit 2. The housing is omitted from FIG. 7. The housing can comprise a door which is not shown in the drawings. The door can form one of the side walls of the housing or the ceiling or can comprise a portion of the side walls or the ceiling. The housing can have substantially cubical shape.

Figure 8:
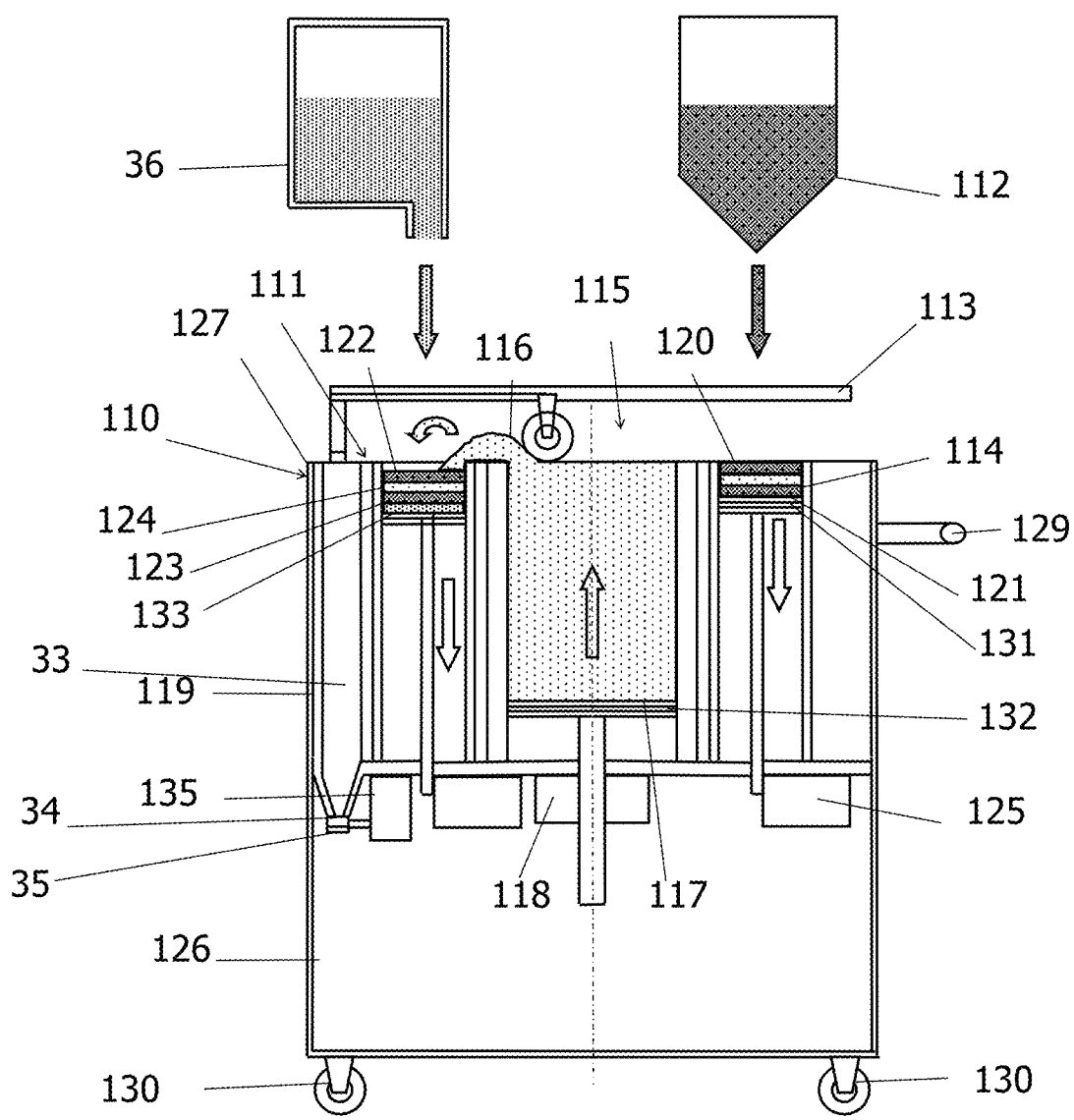

FIG. 8 shows a section through a raw material processing unit of FIG. 7 showing the recycle of the raw material. FIG. 8 shows the variant of the raw material processing unit 110 of FIG. 2 as shown in FIG. 6 or FIG. 7 in section. According to FIG. 8 spent raw material 24 from a build unit 115 can transferred to a raw material container unit 111 of an additive manufacturing device 1.

A solid article 23 is manufactured by the additive manufacturing device 1 comprising the raw material container unit 111 and the build unit 115 and a raw material distribution unit 113. The raw material container unit 111 comprises a first raw material container 114 and a second raw material container 124, the build unit 115 comprises a recipient 116. The raw material distribution unit 113 is configured to transfer the raw material 22 from the first or second raw material container 114, 124 to the recipient 116. The raw material distribution unit 113 can also remove any raw material 22 or any spent raw material 24 present on the cover of the raw material processing unit 110 to an opening 134, which is configured as a discharge opening. The opening 134 is connected to a raw material disposal unit 33. The raw material disposal unit 33 can extend below the opening 134, such that any raw material 22 or spent raw material 24 can fall through the opening 134 into the raw material disposal unit 33. The raw material disposal unit 33 can be configured as a container. According to an embodiment, the raw material disposal unit 33 can include a container, which is laterally inserted into the raw material processing unit 110. According to an embodiment, the raw material disposal unit 33 can include a recipient 36. The recipient 36 is arranged substantially below the first or second raw material chambers 114, 124 or below the recipient 116 of the build unit 115. The raw material disposal unit 33 can have a bottom which can include a bottom opening 34. The bottom opening 34 can be kept closed by a closure member as long as no raw material 22, 24 needs to be removed from the raw material disposal unit 33. The raw material disposal unit 33 can according to an embodiment comprise a sieve element 35. The sieve element 35 can be operated periodically or continuously to supply the raw material 22, 24 to the recipient 36 in a substantially homogeneous flowable state. The raw material in the recipient 36 is therefore substantially free from agglomerates and thus ready to be recycled.

After the manufacture of the solid article 23 is completed, the solid article 23 is removed from the recipient 116 and the solid article 23 is separated from the spent raw material 24 in the recipient 116. The spent raw material 24—which has remained in the recipient after the extraction of the solid article 23 therefrom—is transferred from the recipient 116 to at least one of the first or second raw material containers 114, 124 by the raw material distribution unit 113 as shown in the previous embodiment according to FIG. 5. A layer of raw material 22 can be added on top of the spent raw material 24 in the first or second raw material container 114, 124, thereby providing an alternating sequence of the raw material 22 and the spent raw material 24 to the first or second raw material container 114, 124 whereby the spent raw material 24 is mixed with the raw material 22. The raw material 22 is supplied by a raw material supply unit 112, which can have the same configuration as shown in FIG. 1. In addition thereto, the sieved raw material 32, which is a mixture of new and spent raw material from the or a plurality of previous manufacturing processes, can be supplied to the first or second raw material containers 114, 124.

According to the embodiment of FIG. 8 the first raw material container 114 receives sieved raw material 32 from the recipient 36 and spent raw material 24 from the recipient 116 of the build unit 115. A layer of sieved raw material 32 is placed on top of a layer of spent raw material 24 which is again followed by a layer of sieved raw material 32 in an alternating sequence. The raw material distribution unit 113 can be used to distribute the sieved raw material 32 and the spent raw material 24 in the first raw material container 114. The first raw material container drive unit 125 can be operated to move the first raw material chamber bottom 121 stepwise downwardly, such that a new layer of either sieved raw material 32 or spent raw material 24 can be placed in the volume of the first raw material chamber 120 newly obtained when lowering the first raw material chamber bottom 121 of the first raw material container 114. The alternating sequences of layers of sieved raw material 32 and spent raw material 24 can mix, in particular if layers of a thickness corresponding to the layer thickness used for the additive manufacturing method for the manufacture of the solid article 23 are applied.

According to the embodiment of FIG. 8 the second raw material container 124 receives raw material 22 from the raw material supply unit 112 and spent raw material 24 from the recipient 116 of the build unit 115. A layer of raw material 22 is placed on top of a layer of spent raw material 24 which is again followed by a layer of raw material 22 in an alternating sequence. The raw material distribution unit 113 can be used to distribute the raw material 22 and the spent raw material 24 in the second raw material container 124. The second raw material container drive unit 135 can be operated to move the second raw material chamber bottom 123 stepwise downwardly, such that a new layer of either raw material 22 or spent raw material 24 can be placed in the volume of the second raw material chamber 122 newly obtained when lowering the second raw material chamber bottom 123 of the second raw material container 124. The alternating sequences of layers of raw material 22 and spent raw material 24 can mix, in particular if layers of a thickness corresponding to the layer thickness used for the additive manufacturing method for the manufacture of the solid article 23 are applied.

According to an alternative recycling method, the raw material 22 from the raw material supply unit 112 can be distributed by the raw material distribution unit 113 to the first and second raw material containers 114, 124. The spent raw material 24 from recipient 117 can be distributed by the raw material distribution unit 113 to the first and second raw material containers 114, 124. The sieved raw material 32 from recipient 36 can be distributed by the raw material distribution unit 113 to the first and second raw material containers 114, 124. According to this embodiment, the raw material in the first and second raw material containers 114, 124 is a mixture of the raw material 22, the spent raw material 24 and the sieved raw material 32.

Upon completion of the recycling steps, the first and second raw material chamber bottom 121, 123 is in the lowermost position. The recipient bottom 117 is in the uppermost position.

The build unit 115 according to any of the preceding embodiments thus comprises the recipient 116 of variable volume configured to distribute the portion of the spent raw material 24 to the first or second raw material container 114, 124. The recipient bottom 117 can be connected to the build unit drive unit 118 to move the recipient bottom 117 to change the volume of the recipient 116, in particular to reduce the volume of the recipient 116 stepwise. Upon reduction of the volume of the recipient 116 to be close to zero, the raw material processing unit 110 is ready for the start of a new additive manufacturing process. At the same time the volume of the first and second raw material containers 114, 124 assumes its maximum value.

The position of the raw material supply unit 112 with respect to the first and second raw material containers 114, 124 can be chosen arbitrarily, therefore the configuration shown in FIG. 8 is only of exemplary nature. The recycling method works in the same way if the raw material supply unit 112 feeds the raw material 22 to the first raw material container 114 and the recipient 36 feeds the sieved raw material 32 to the second raw material container 124. The position of the first and second raw material containers 114, 124 can change with respect to the position of the raw material supply unit 112 or the recipient 36.

The raw material supply unit 112 can include a raw material supply container, such as a hopper, which is filled with raw material. The raw material supply container can be movable or can be fixed.

According to an embodiment, a displacement mechanism can be provided to lift or lower the bottom surface of the raw material supply unit or the raw material container unit, e.g. a level adjustment mechanism 31. According to an embodiment, a raw material disposal unit is provided configured to receive surplus raw material.

Figure 9:
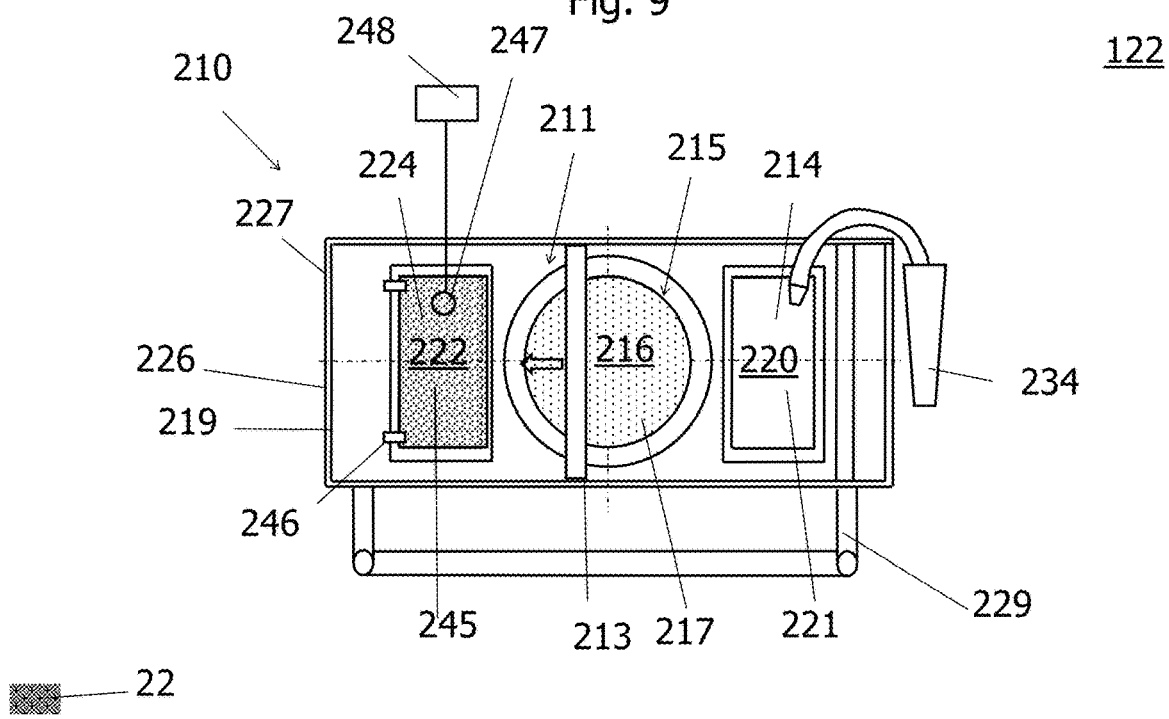
Figure 10:
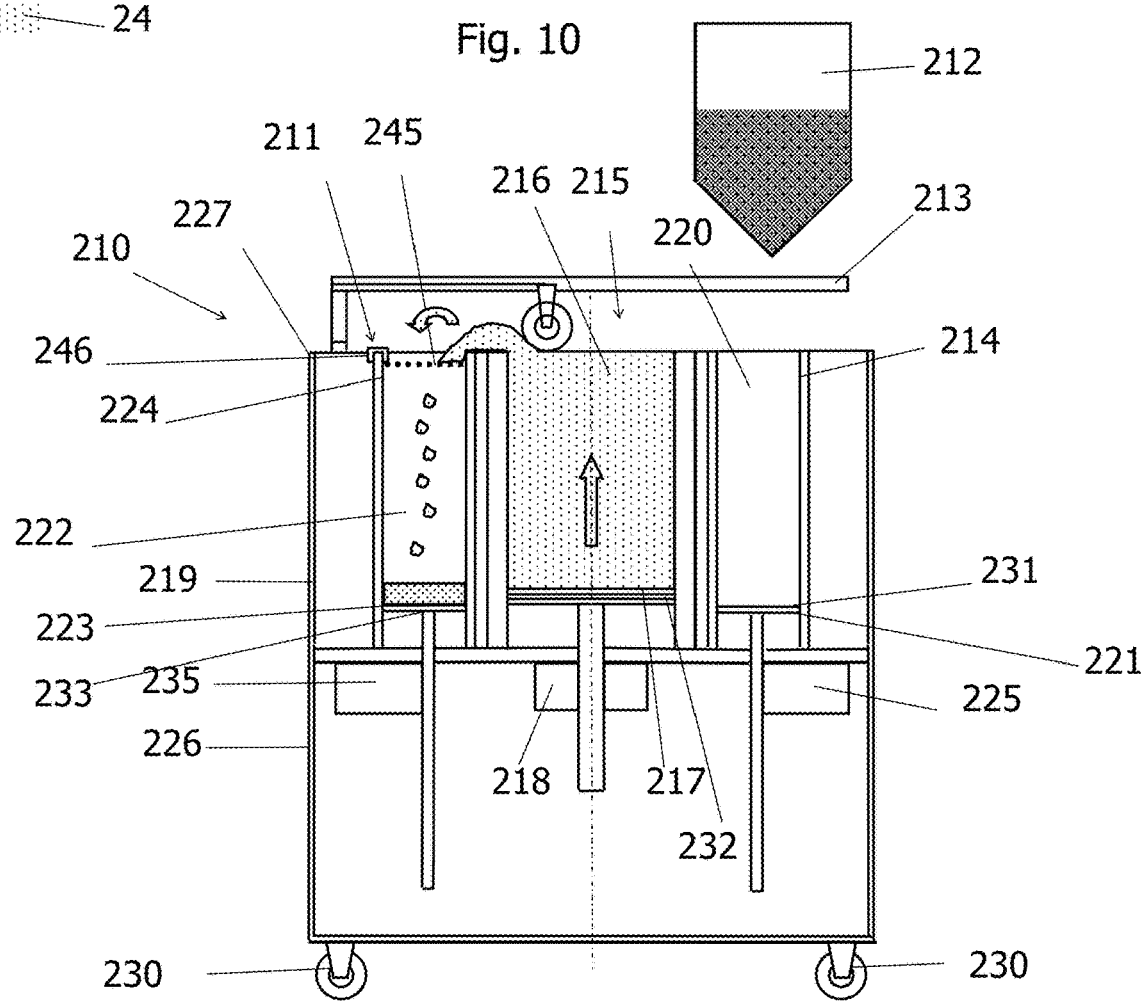

FIGS. 9 to 11 show a further embodiment of a raw material processing unit. FIG. 9 shows a top view on a raw material processing unit 210 according to a fourth embodiment. The raw material container unit 211 comprises a build unit 215 of circular cross-section and a first and second raw material container 214, 224 of rectangular cross-section. By providing a raw material container 214, 224 or alternatively or additionally also a build unit 215 of a rectangular cross-section, a substantial amount of space can be saved. A raw material processing unit 210 containing at least one of the build unit 215 or the first and second raw material container 214, 224 of rectangular cross-section is therefore more compact than the prior art variants containing only raw material containers and build units of circular cross-section. A raw material distribution unit 213 may be configured to move raw material 22 from any of the first or second raw material container 214, 224 to the built unit for manufacturing a solid article as previously described.

After the manufacture of the solid article has been completed, the raw material processing unit 210 is disengaged from the additive manufacturing device. The raw material processing unit 210 can be moved to a post-processing station. The post-processing station can include a cleaning station, a station for separation of the solid article from the spent raw material, a station for recycling spent raw material.

After the manufacture of the solid article is completed, the solid article is immersed in the spent raw material in the build unit 215. The spent raw material contained in the recipient 216 of the build unit 215 can be raised for extraction of the solid article in the post-processing station. The post-processing station may be disposed with a suction unit for continuously removing air from of the post-processing station. Any raw material particles in the air are thereby removed from the post-processing station, to avoid any risk of accidental inhalation of any raw material dust by any person manipulating the raw material processing unit 210.

The solid article can be cleaned manually or automatically from any spent raw material resting attached to it. The spent raw material can be collected on the cover of the raw material processing unit 210 and in any of the first or second raw material containers 214, 224. A suction cleaning device can be used to remove the spent raw material from any surface of the raw material processing unit 210, e.g. from the cover, the recipient 216, the first and second raw material chambers 220, 222 of the first or second raw material containers 214, 224. The suction cleaning device can comprise a spent raw material container 234 or can be connected to a spent raw material container 234. The spent raw material container 234 can be arranged inside the housing 219 or can be a separate item, which can be arranged outside of the housing 219 as shown in FIG. 9.

The housing 219 of the raw material processing unit 210 includes the wall 226 and the wall edge 227 whereby in the operative state, the wall edge 227 is configured to be inserted into the housing 9 of the energy generation unit 2. The housing 9 is not shown in FIG. 9 or FIG. 10. Furthermore, the post-processing station may also comprise a housing. The housing of the post-processing station is also omitted from the drawings.

Any spent raw material 24 remaining in the recipient 216 can be recycled. The spent raw material 24 collected in the spent raw material container 234 can also be recycled. Such spent raw material 24 may contain agglomerates or other impurities resulting from the previous manufacturing process. Such agglomerates may be present as solid lumps, which can be separated from the spent raw material 24, which has remained a powder, by means of sieving.

For this reason, a sieve element 245 can be attached to one of the first or second raw material containers 214, 224. In FIG. 9, such a sieve element 245 is attached to the second raw material container 224, just to show a non-limiting example. The sieve element 245 can be configured to cover the opening of the second raw material chamber 222. The sieve element 245 can comprise attachment elements 246, such as clamps, to retain the sieve element 245 stably in the opening of the second raw material chamber 222. The sieve element 245 is configured in such a manner, that no upstanding parts thereof stick above the surface of the raw material processing unit 210 which is exposed to the raw material distribution unit 213. If the attachment elements 246 project above the surface of the raw material processing unit, such attachment elements 246 are arranged on the wall side of the second raw material chamber 222 and not on the build unit side of the second raw material chamber 222. The raw material distribution unit 213 can be controlled to stop prior to any contact with any attachment elements 246 of the sieve element 245.

According to an embodiment, the sieve element 245 may be disposed with a vibration generation device 247. The vibration generation device 247 is configured to induce a vibratory movement of the sieve element or a portion thereof. Such vibratory movement may assist to decompose any agglomerates present in the spent raw material 24. The vibration generation device 247 may comprise a control unit 248 for initiating or stopping the vibratory movement manually or automatically.

In operation, the recipient 216 of the build unit 215 is positioned in its lowermost position by actuating the build unit drive unit 218. The recipient 216 is filled with spent raw material 24. The sieve element 245 is placed onto the opening of the second raw material chamber 222 of the second raw material container 224. According to an embodiment not shown in the drawings, the sieve element 245 could also be placed onto the opening of the first raw material chamber 220 of the first raw material container 214. According to an embodiment not shown in the drawings, a sieve element can be placed on onto the opening of the first and the second raw material chamber 220, 222 of the respective first and second raw material containers 214, 224. The recipient 216 is then lifted in a stepwise manner by the build unit drive unit 218. After each lifting step, the raw material distribution unit 213 is actuated to pass over the surface of the raw material processing unit 210 in the direction of the second raw material container 224. The spent raw material portion which has been lifted above the surface level of the raw material processing unit is moved by the raw material distribution unit 213 onto the sieve element 245. This operation is shown in FIG. 10. The spent raw material 24 drops through the openings of the sieve element to be collected in the second raw material chamber 222. The second raw material chamber bottom 223 may be in the lowermost position as shown in FIG. 10 or may be lowered stepwise by the second raw material container drive unit 235. The sieved spent raw material is collected in the second raw material chamber 222 either for the manufacture of another solid article or may also be removed from the second raw material container 224, e.g. by a suction device.

FIG. 10 shows a section through a raw material processing unit 210 of FIG. 9 showing a post-processing step for recycling spent raw material. The additive manufacturing device 1 is again omitted from FIG. 10 as the post-processing step may be performed in a post-processing station located distantly with respect to the additive manufacturing device 1. The configuration of the energy generation unit can be such that it is suitable for the combination with the raw material processing unit 210. The additive manufacturing device 1 for manufacturing a solid article thus comprises the energy generation unit 2 and the raw material processing unit 210, when ready for operation or in the operating state. The energy generation unit 2 comprises an energy beam generation unit which can emit an energy beam 5, e.g. as shown in FIG. 1.

The raw material processing unit 210 comprises a raw material container unit 211, a build unit 215 and a raw material distribution unit 213. The raw material container unit 211 comprises a first raw material container 214 containing a raw material 22 or a spent raw material 24 for the manufacture of a solid article 23 when the raw material processing unit 210 is ready for the production of the solid article. The raw material container unit 211 comprises a second raw material container 224 containing also raw material 22 or a spent raw material 24 for the manufacture of the solid article 23 when the raw material processing unit is ready for the production of the solid article. The build unit 215 is configured to receive the raw material 22 from the first and second raw material containers 214, 224 when the solid article is about to be manufactured.

The raw material distribution unit 213 is configured to transport a portion of the raw material 22 from at least one of the first or second raw material containers 214, 224 to the build unit 215. The first and second raw material containers 214, 224 comprise a respective first and second raw material chamber 220, 222 of variable volume, whereby the raw material chamber 220, 222 comprises a respective first and second raw material chamber bottom 221, 223. The first and second raw material chamber bottom 221, 223 is connected to a respective first and second raw material container drive unit 225, 235 for moving the corresponding first and second raw material chamber bottom 221, 223 to change the volume of the respective first and second raw material chamber 220, 222 when in operation.

The build unit 215 comprises a recipient 216 of variable volume configured to receive the portion of the raw material 22 from one of the first or second raw material containers 214, 224. The build unit 215 comprises a recipient bottom 217 connected to a drive unit 218 for moving the recipient bottom 217 to change the volume of the recipient 216 when in operation. As each of the first and second raw material chamber bottoms 221, 223 and the recipient bottom 217 are moveable, a first sealing element 231 is provided on the circumference of the first raw material chamber bottom 221. Furthermore, a second sealing element 233 is provided on the circumference of the second raw material chamber bottom 223. A recipient bottom sealing element 232 is provided on the circumference of the recipient bottom 217.

The raw material processing unit 210 comprises a housing 219 for the raw material container unit 211, the build unit 215 and the raw material distribution unit 213. Transport elements, for example wheels 230, are provided on the underside of the housing 219 for moving the raw material processing unit 210 freely on a floor or other surface. The raw material processing unit 210 is removably connectable to the energy generation unit 2 and freely movable in any direction when not connected to the energy generation unit 2. The raw material processing unit 210 is movable from the additive manufacturing device 1 to a post-processing station for extraction of the manufactured article or for recycling the superfluous spent raw material. A plurality of post-processing stations can be provided to perform one or more of these steps contemporaneously.

According to this embodiment, the housing 219 includes a circumferential wall 226. The circumferential wall 226 comprises a wall edge 227, whereby the wall edge 227 can comprise an engagement mechanism for connection with an energy generation unit 2 of the additive manufacturing device for manufacturing a solid article. The engagement mechanism can comprise one of a hook, a groove, a snap-fit mechanism.

The raw material processing unit 210 can further comprise a manipulation element 229, such as a handle for moving the raw material processing unit 210 on the shop floor to any desired location.

The raw material processing unit 210 can also comprise a level adjustment mechanism. The level adjustment mechanism can be used to adjust the raw material processing unit 210 in height such that when the raw material processing unit 210 and the energy generation unit 2 are connected, a sealing effect is obtained to prevent heat and/or raw material loss when performing an additive manufacturing method.

The additive manufacturing device 1 is shown in a schematic view in section. The additive manufacturing device 1 can include a heat exchange unit, which can comprise a heat source for heating a raw material 22 provided in the recipient 216. The heat exchange unit is not shown in FIG. 10. The solid article 23 is generated by an additive manufacturing method in the recipient 216. The additive manufacturing device 1 comprises an energy beam generation unit, in particular a diode laser generation unit.

The raw material 22 has a raw material surface exposed to an energy beam 5 emitted by the energy beam generation unit when in operation. The energy beam 5 is directed onto the raw material surface. The raw material 22 is heated at the raw material surface in any location which is exposed to the energy beam 5. The energy beam 5 usually melts the raw material 22 at the raw material surface whereby a coherent sub-structure is formed. The coherent sub-structure at the portion of the raw material which is impinged by the energy beam 5 differs from the raw material, which is usually in a flowable state, that can be one of a powder or a liquid or any combination of liquid and powder such as a slurry. This coherent sub-structure solidifies as soon as the energy beam 5 is redirected onto another location or spot of the raw material surface. The coherent sub-structure adheres also to any coherent sub-structure present below the raw material surface e.g. in a previously applied layer of raw material which had been exposed to the energy beam 5 in a previous process sequence.

The operation of the energy beam 5 is controlled by a control unit. The energy beam generation unit is disposed with a directing unit to direct the energy beam 5 onto the raw material surface according to a computer-generated model of the solid article 23 stored in a storage unit associated with the control unit. Thereby, the operation of the directing unit is controlled by the control unit. The energy beam 5 generated by the energy beam generation unit passes through the heat exchange unit, which can comprise a heating surface, onto the raw material surface. Thus, the energy beam 5 traverses the heating surface of the heat source. In particular, the heating surface is transparent for an energy beam e.g. of a diode laser. Advantageously the heating surface is transparent for light of a wavelength in a range of 100 nm up to and including 1 mm.

The generation of a solid article 23 by an additive manufacturing method in the additive manufacturing device 1 involves the following steps. A portion of the raw material 22 stored in the first or second raw material container 214, 224 is supplied as a layer of a thickness of less than 1 mm by the raw material distribution unit 213 to the recipient 216. According to a preferred embodiment, the thickness or height of the layer can be about 100 μm.

The first raw material container 214 includes a first raw material container drive unit 225 for moving the first raw material chamber bottom 221 of the first raw material container 214 upwardly in a stepwise manner. The second raw material container 224 includes a second raw material container drive unit 235 for moving the second raw material chamber bottom 223 of the second raw material container 224 upwardly in a stepwise manner. Thereby, the raw material 22 for a new layer of raw material to be supplied on top of the raw material surface is provided. For the generation of each new raw material layer, the first raw material chamber bottom 221 of the first raw material container 214 or the second raw material chamber bottom 223 of the second raw material container 224 is moved upwardly in a stepwise manner, such that a portion of the raw material 22 having a volume corresponding to the thickness of a new raw material layer is supplied to the recipient 216 of the build unit 215. The raw material distribution unit 213 can be used to move the portion of the raw material 22 from one of the first or second raw material containers 214, 224 to the recipient 216 of the build unit 215. The first raw material chamber 220 of the first raw material container 214 and the second raw material chamber 222 of the second raw material container 224 are shown in FIG. 10 in section. The front walls of the first and second raw material chambers 220, 222 as well as of the recipient 216 are omitted to show the interior of the first and second raw material chambers 220, 222 and the recipient 216.

The raw material 22 is distributed on the surface of the first or previous layer for which the additive manufacturing method has already been completed.

The raw material distribution unit 213 can be in particular be configured as a roller element or as a sliding element or a combination thereof. The raw material distribution unit 213 can perform a sliding or rolling movement. The raw material distribution unit 213 thereby pushes the volume of raw material supplied for generation of the second or subsequent layer to the build unit 215.

The recipient bottom 217 of the recipient 216 is also movable in a direction normal to the raw material surface. A build unit drive unit 218 is connected to the recipient bottom 217. In particular, the recipient bottom 217 is movable downwardly. Each new layer of each portion of the raw material 22 supplied from one of the first and second raw material containers 214, 224 is deposited on the previous layer and each of the layers contains a portion of the solid article 23 to be manufactured.

The raw material can be heated by a heat exchange unit, which can be integrated into the additive manufacturing device 1 and which is not shown in the drawings. The heat exchange unit can comprise a heat source, which can include a heating surface to provide thermal energy to the raw material surface to form a pre-heated raw material surface. The heat source can be of a circular or rectangular cross-section in particular corresponding to the cross-section of the recipient 216 of the build unit 215. The recipient 216 can also be of circular or rectangular cross-section. The heat source can contain an annular heating surface or a heating surface of rectangular cross-section. The heating surface can be transparent to the energy beam 5, such that the energy beam 5 can pass through the heating surface. The heating surface can contain at least one of a radiation heater or a resistance heater. The energy beam 5 generated and emitted by the energy beam generation unit is directed by the directing unit onto the pre-heated raw material surface.

The heat exchange unit can be configured as a temperature homogenization box comprising a wall which delimits a channel such that the channel is laterally at least partially enclosed by the wall. The wall has a first wall edge and a second wall edge, whereby in the operative state, the second wall edge is configured to face the raw material surface of the raw material 22 contained in the recipient 216 of the build unit 215. The temperature homogenization box is attachable to the housing of the energy generation unit 2. The housing is omitted from FIG. 10. The housing can comprise a door which is not shown in the drawings. The door can form one of the side walls of the housing or the ceiling or can comprise a portion of the side walls or the ceiling. The housing can have substantially cubical shape.

FIG. 11 shows a section through a raw material processing unit of FIG. 10 showing the mixing of the raw material 22 with the spent raw material 24. FIG. 11 shows the variant of the raw material processing unit 210 of FIG. 9 or FIG. 10. According to FIG. 11 spent raw material 24 from the first raw material container 214 is transferred by the raw material distribution unit 213 to the build unit 215. Raw material 22 from the second raw material container 224 is transferred by the raw material distribution unit 213 to the build unit 215. After the manufacture of the solid article 23 is completed, the solid article 23 is removed from the recipient 216 and the solid article 23 is separated from the spent raw material 24 in the recipient 216. The spent raw material 24—which has remained in the recipient after the extraction of the solid article 23 therefrom—is transferred from the recipient 216 to at least one of the first or second raw material containers 214, 224 by the raw material distribution unit 213 as shown in FIG. 10.

A mixture of raw material 22 and spent raw material 24 can be prepared in the raw material container unit 211 and the build unit 215 and a raw material distribution unit 213. A layer of raw material 22 can be added on top of the spent raw material 24 in the first or second raw material container 214, 224, thereby providing an alternating sequence of the raw material 22 and the spent raw material 24 to the first or second raw material container 214, 224 whereby the spent raw material 24 is mixed with the raw material 22. The raw material 22 is supplied by a raw material supply unit 212, which can have the same configuration as shown in FIG. 1. In addition thereto, the sieved raw material 32, which is a mixture of new and spent raw material from the or a plurality of previous manufacturing processes, can be supplied to the first or second raw material containers 214, 224.

The raw material container unit 211 comprises a first raw material container 214 and a second raw material container 224, the build unit 215 comprises a recipient 216. The raw material distribution unit 213 is configured to transfer the raw material 22 and the spent raw material 24 from the respective first or second raw material container 214, 224 to the recipient 216. The raw material distribution unit 213 thus places the raw material 22 or any spent raw material 24 from one of the first or second raw material containers 214, 224 into the recipient. Thus the recipient 216 of the build unit 215 is used as a vessel for receiving the mixture. According to an embodiment not shown in the drawings, the recipient can include an opening connected to a raw material storage unit 253. The raw material storage unit 253 can extend below the opening, such that any mixed raw material 32 can be transferred into the raw material storage unit 253. The raw material storage unit 253 can be configured as a container. According to an embodiment, the raw material storage unit 253 can include a container, which is frontally, rearwardly or laterally inserted into the raw material processing unit 210. According to an embodiment, the raw material storage unit 253 can include a recipient 256. The recipient 256 can be arranged substantially below the first or second raw material chambers 214, 224 or below the recipient 216 of the build unit 215. The raw material storage unit 253 can have a top which can include an opening 254. The raw material storage unit 253 can according to an embodiment comprise a sieve element 255. In particular, the sieve element 255 can be arranged in the opening 254. The sieve element 255 can be subjected to vibratory movement periodically or continuously to sieve mixed raw material from the recipient 216 and to store the sieved mixed raw material in the recipient 256 in a substantially homogeneous flowable state for the purpose of recycling the sieved mixed raw material for the manufacture of a solid article. The sieved mixed raw material in the recipient 256 is therefore substantially free from agglomerates and thus ready to be recycled. In an embodiment not shown in the drawings, the raw material storage unit may be separate from the raw material processing unit. A hose may be used to connect the chamber of the recipient 216 to the raw material storage unit 253. The raw material storage unit 253 can also be connected to or form a unit with the spent raw material container 234.

According to the embodiment of FIG. 11 the second raw material container 224 can contain sieved raw material 32 from the processing step as shown in FIG. 10 and the first raw material container 214 can contain raw material 22 from a raw material supply unit 212 schematically pictured as a hopper arranged above the first raw material container 214. A layer of sieved raw material 32 is placed on top of a layer of raw material 24 which is again followed by a layer of sieved raw material 32 in an alternating sequence. The raw material distribution unit 213 can be used to distribute the sieved raw material 32 and the raw material 22 into the recipient 216. The first raw material container drive unit 225 can be operated to move the first raw material chamber bottom 221 stepwise upwardly, such that a new layer of raw material 22 can be placed in the recipient 216. The second raw material container drive unit 235 can be operated to move the second raw material chamber bottom 223 stepwise upwardly, such that a new layer of sieved raw material 32 can be placed in the recipient 216. The alternating sequences of layers of sieved raw material 32 and raw material 22 can mix, in particular if layers of a thickness corresponding to the layer thickness used for the additive manufacturing method for the manufacture of the solid article 23 are applied. An additional mixing can be provided if the mixed raw material is transferred into a raw material storage unit 253, whereby an additional mixing step can be optionally added by providing a further sieve element 255.

According to another embodiment not shown in FIG. 11, the first raw material container 214 receives raw material 22 from the raw material supply unit 212 and spent raw material 24 from the recipient 216 of the build unit 215 which has been transferred from the recipient 216 to the second raw material container 224 without performing a sieving of the spent raw material 24 as shown in FIG. 10. A layer of raw material 22 is placed on top of a layer of spent raw material 24 which is again followed by a layer of raw material 22 in an alternating sequence. The raw material distribution unit 213 can be used to distribute the raw material 22 and the spent raw material 24 into the recipient 216. The second raw material container drive unit 235 can be operated to move the second raw material chamber bottom 223 stepwise upwardly, such that a new layer of either raw material 22 or spent raw material 24 can be placed in the volume of the recipient 216 by the raw material distribution unit 213. The alternating sequences of layers of raw material 22 and spent raw material 24 can mix, in particular if layers of a thickness corresponding to the layer thickness used for the additive manufacturing method for the manufacture of the solid article 23 are applied.

According to an alternative recycling method, the raw material 22 from the raw material supply unit 212 can be distributed by the raw material distribution unit 213 to the first and second raw material containers 214, 224 by dosing a quantity of raw material corresponding to a layer into one of the first or second raw material container 214, 224. The spent raw material 24 from recipient 216 can be distributed by the raw material distribution unit 213 to the first and second raw material containers 214, 224. The recipient is moved upwardly when the build unit drive unit 218 is operated, whereas the first and second raw material containers 214, 224 are moved downwardly when their respective first or second raw material container drive units 225, 235 are operated.

The spent raw material 24 from recipient 216 can be distributed by the raw material distribution unit 213 to the first and second raw material containers 214, 224. According to this embodiment, the raw material in the first and second raw material containers 214, 224 is a mixture of the raw material 22 and the spent raw material 24. The recipient 216 can also contain the sieved raw material 32 obtained by sieving process as shown in FIG. 9 or FIG. 10.

Upon completion of the recycling steps, the first and second raw material chamber bottom 221, 223 is in the lowermost position. The recipient bottom 217 is in the uppermost position.

The build unit 215 according to any of the preceding embodiments thus comprises the recipient 216 of variable volume configured to distribute the portion of the spent raw material 24 to the first or second raw material container 214, 224. The recipient bottom 217 can be connected to the build unit drive unit 218 to move the recipient bottom 217 to change the volume of the recipient 216, in particular to reduce the volume of the recipient 216 stepwise. Upon reduction of the volume of the recipient 216 to be close to zero, the raw material processing unit 210 is ready for the start of a new additive manufacturing process. At the same time the volume of the first and second raw material containers 214, 224 assumes its maximum value, thus the first and second raw material containers are completely filled.

The position of the raw material supply unit 212 with respect to the first and second raw material containers 214, 224 can be chosen arbitrarily, therefore the configuration shown in FIG. 11 is only of exemplary nature. The recycling method works in the same way if the raw material supply unit 212 feeds the raw material 22 to the first raw material container 214 and the sieved raw material 32 is supplied to the second raw material container 224. The position of the first and second raw material containers 214, 224 can change with respect to the position of the raw material supply unit 212.

The raw material supply unit 212 can include a raw material supply container, such as a hopper, which is filled with raw material. The raw material supply container can be movable or can be fixed. The raw material supply unit 212 can comprise a dosing unit for supplying a metered quantity of raw material 22 to the process.

According to an embodiment, a displacement mechanism can be provided to lift or lower the bottom surface of the raw material supply unit or the raw material container unit, e.g. a level adjustment mechanism. According to an embodiment, a raw material disposal unit is provided configured to receive surplus raw material.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or the claims refer to at least one of an element or compound selected from the group consisting of A, B, C . . . and N, the text should be interpreted as requiring only one element from the group, not A plus N, or B plus N, etc.

The invention claimed is:

1. An additive manufacturing device comprising a movable raw material processing unit for manufacturing a solid article, wherein the raw material processing unit comprises a housing configured as a transport device configured to be disengaged from the additive manufacturing device, wherein the housing of the raw material processing unit contains a raw material container unit, a build unit and a raw material distribution unit, and wherein the housing is removable from the additive manufacturing device, wherein a solid article is manufactured by the additive manufacturing device comprising the raw material container unit and the build unit and a raw material distribution unit, wherein the raw material container unit comprises a raw material container and the build unit comprises a recipient, such that after the manufacture of the solid article is completed, the solid article is removed from the recipient and the solid article is separated from spent raw material in the recipient, wherein the raw material distribution unit is configured to transfer the spent raw material or a sieved raw material from the recipient or from a raw material disposal unit or from a spent raw material container or a raw material storage unit to the raw material container, wherein the raw material container contains a raw material for the manufacture of the solid article, wherein the build unit receives the raw material from the raw material container, wherein, in operation, the raw material distribution unit transports a portion of the raw material from the raw material container to the build unit, wherein the raw material container comprises a raw material chamber of variable volume and a raw material chamber bottom, wherein the raw material chamber bottom can be connected to a raw material container drive unit to move the raw material chamber bottom to change the variable volume of the raw material chamber, wherein the build unit comprises a recipient of the variable volume configured to receive the portion of the raw material from the raw material container, wherein the build unit comprises a recipient bottom which can be connected to a build unit drive unit to move the recipient bottom to change the variable volume of the recipient, wherein, in operation, a layer of the raw material is added on top of the spent raw material or sieved raw material in the respective raw material container, thereby providing an alternating sequence of the raw material and the spent raw material or the sieved raw material to the raw material container and wherein the spent raw material or the sieved raw material is mixed with the raw material.

2. The additive manufacturing device of claim 1, wherein the raw material container unit comprises a raw material container configured to contain a raw material for the manufacture of a solid article, wherein the build unit is configured to receive the raw material from the raw material container, and wherein the raw material distribution unit is configured to transport a portion of the raw material from the raw material container to the build unit.

3. The additive manufacturing device of claim 2, wherein the raw material distribution unit comprises a first raw material container and a second raw material container, each comprising a first and second raw material chamber of variable volume, wherein each of the first and second raw material chambers comprise a first and second raw material chamber bottom, wherein the first and second raw material chamber bottom is connected to a respective first and second raw material container drive unit for moving the raw material chamber bottom to change the variable volume of the raw material chamber when in operation.

* * * * *